United States Patent
Uchida et al.

(10) Patent No.: US 7,347,486 B2
(45) Date of Patent: Mar. 25, 2008

(54) METAL TUBE FOR REINFORCING CAR BODY AND CAR BODY REINFORCEMENT THEREWITH

(75) Inventors: Mitsutoshi Uchida, Hyogo (JP); Kenji Moroi, Tochigi (JP); Yoshitaka Hattori, Gunma (JP); Yoshikatsu Iino, Gunma (JP); Saburo Inoue, Tokyo (JP); Fumihiko Kikuchi, Tokyo (JP)

(73) Assignees: Sumitomo Metal Industries, Ltd., Osaka (JP); H-One Co, Ltd., Saitama (JP); Sumitomo Pipe & Tube Co., Ltd., Ibaraki (JP)

( * ) Notice: Subject to any disclaimer, the term of this patent is extended or adjusted under 35 U.S.C. 154(b) by 0 days.

(21) Appl. No.: 11/453,841

(22) Filed: Jun. 16, 2006

(65) Prior Publication Data

US 2007/0001483 A1 Jan. 4, 2007

Related U.S. Application Data

(63) Continuation of application No. PCT/JP2004/018835, filed on Dec. 16, 2004.

(30) Foreign Application Priority Data

Dec. 17, 2003 (JP) .............................. 2003-419455

(51) Int. Cl.
*B60J 5/00* (2006.01)

(52) U.S. Cl. ............... 296/187.03; 296/146.6; 296/187.12; 293/102; 29/897.2

(58) Field of Classification Search ............ 296/146.6, 296/187.03, 187.12, 187.04, 187.09, 187.1, 296/187.11; 293/102; 29/897.2; 49/502

See application file for complete search history.

(56) References Cited

U.S. PATENT DOCUMENTS

| | | | | |
|---|---|---|---|---|
| 5,232,261 | A | * | 8/1993 | Kuroda et al. ............ 296/146.4 |
| 6,325,431 | B1 | * | 12/2001 | Ito .............................. 293/102 |
| 2004/0075296 | A1 | | 4/2004 | Doi et al. |

FOREIGN PATENT DOCUMENTS

| | | |
|---|---|---|
| CA | 2 437 896 | 9/2002 |
| JP | 4-280924 | 10/1992 |
| JP | 7-125537 | 5/1995 |
| JP | 9-156367 | 6/1997 |
| JP | 2811226 | 8/1998 |
| JP | 2002-248941 | 9/2002 |
| WO | WO 02/068232 | 9/2002 |

* cited by examiner

*Primary Examiner*—Joseph D. Pape
(74) *Attorney, Agent, or Firm*—Clark & Brody

(57) ABSTRACT

A metal tube for reinforcing car body, and a car body reinforcement according to the invention have a curved portion extending over the entire longitudinal length or a local longitudinal length, wherein, when the reinforcement is assembled such that the outer periphery of the curved portion is aligned substantially in the direction of impact applied to the car body, the load ramp gradient, the maximum load and the absorbed energy are all enhanced in case of a car body collision. Particularly, an increase in the load ramp gradient as for the load property at the start of deformation provides an excellent crash capacity in reinforcing the car body. Moreover, the metal tube and the reinforcement according to the invention are capable of satisfying the current requirements for much more crash capacity of the car body, along with both a weight reduction of the car body and a reduced manufacturing cost, and therefore they are applicable in a wide field for protecting occupants in an automobile.

22 Claims, 21 Drawing Sheets

US 7,347,486 B2

METAL TUBE FOR REINFORCING CAR BODY AND CAR BODY REINFORCEMENT THEREWITH

CROSS REFERENCE TO RELATED APPLICATIONS

This application is a continuation of International Patent Application No. PCT/JP2004/018835, filed Dec. 16, 2004. This PCT application was not in English as published under PCT Article 21(2).

BACKGROUND OF THE INVENTION

1. Technical Field

The present invention relates to a metal tube for reinforcing car body, which provides an excellent crash capacity in case of a car body collision, along with a reduction in the weight of the car body, and the present invention also relates to a car body reinforcement produced therewith.

2. Description of the Related Art

In recent years, requirements on the safety for a car body are increasing in the automobile industry, and the technology for protecting occupants in the case of a collision has been developed. In conjunction with the facts, for improving performance of protecting occupants, the structure of car body components inclusive of doors in a vehicle was reconsidered and tried to employ reinforcements for efficiently protecting occupants.

FIG. 1 is a drawing showing the structure of a car body in which the reinforcements are used, as example, as door impact bars for a door in an automobile. The door 1 is formed in such a way that a window frame 3 is disposed onto the upper part of a door inner 2 in one-piece structure, so that it is constituted by jointing a door outer (not shown) to the door inner 2 on the car outside. Moreover, the door 1 is connected to the car body 4 on the front side thereof (left side in the drawing) by means of upper and lower hinges 5a and 5b, and on the rear side (right side in the drawing), the door is further equipped with a door lock 6 at the middle level of the door inner 2. Such a structural arrangement allows the door to be opened/closed freely and to be secured in the close position by the door lock 6.

Each of the above-described door impact bars (reinforcement) 7 has brackets 8 for connecting the impact bar to the car body at both ends thereof. In such a constitution of the reinforcement shown in FIG. 1, the bracket 8 is connected either to the hinge 5 or to the door lock 6. Accordingly, a door impact bar 7a is interposed between the portion onto which the upper hinge 5a is mounted and the portion onto which the door lock 6 is mounted, and the other impact bar 7b is interposed between the portion onto which the lower hinge 5b is mounted and the portion onto which the door lock 6 is mounted.

The above-described reinforcement shown in FIG. 1 has a structure in which brackets are used to connect tube ends to the car body, thereby enabling the brackets to be connected to the car body. In another embodiment, a so-called bracket-less structure is employed, wherein no bracket are disposed at both ends of the reinforcement, and therefore both ends of the reinforcement are directly connected to the car body.

Recently, a requirement for reducing the weight of a car body in an automobile is increasing in view of requirements for decreasing the fuel consumption and/or the manufacturing cost. As a result, the promotion of the weight reduction is also strongly required in such a reinforcement for enhancing the safety. For such a requirement, several methods have been proposed for reducing the weight by using steel tubes and/or steel sheets having high strength in a conventional reinforcement.

For instance, Japanese Patent No. 2811226 has disclosed a steel tube for reinforcing car body having both a tensile strength of not less than 120 kgf/mm$^2$ (1180 MPa) and an elongation not less than 10% for such a core element as a door impact bar, a bumper or the like, which is used as a steel tube for reinforcing the door to ensure the safety of a driver in the case of a side collision of an automobile. In accordance with the properties of the steel tube, the weight of the steel tube for reinforcing car body can be reduced and the energy of impact can be efficiently absorbed by selectively determining the shape of the steel tube as for given conditions of operation.

Furthermore, a method for using a pipe to reinforce a door has also been proposed, wherein the pipe is produced from a steel tube having a low strength or a steel sheet having a low strength, and then the tensile strength is enhanced by applying the quenching process thereto. For instance, such a method is disclosed in Japanese Patent Application Publication No. 04-280924, wherein a straight steel pipe is directly heated up by supplying an electric current thereinto, and then quenched by injecting cooling water to the steel pipe under a condition that a tensile force is applied to the steel pipe in order to avoid bending.

As described above, the car body reinforcement produced from a conventional steel tube provides to some extent an increase in the mechanical strength and a reduction in the weight, and it is prerequisite to use a straight tube in any case. However, it is found that such a conventional reinforcement produced by a straight tube provides a limitation in the weight reduction and in enhancement of collision property.

FIG. 2 shows diagrams showing the dependence of the load on the displacement of a striker in the three-point bending test (supported at both ends) for a steel tube to explain the impact characteristic. The impact characteristic is evaluated as for the following items: the load ramp gradient representing the characteristic for an applied load at the start of deformation; the maximum load representing the maximum value of the load; and the absorbed energy which can be expressed as a value obtained by integrating the load with respect to the displacement.

That is, regarding the crash capacity required for a car body reinforcement, it is necessary to increase the load ramp gradient, the maximum load and the absorbed energy when the reinforcement is deformed due to the collision from the outside, in particular to increase the load ramp gradient as for the load property at the start of deformation. In view of this fact, FIG. 2A shows the behavior of deformation in a steel tube having an excellent crash capacity, whereas FIG. 2B shows the behavior of deformation having an inferior crash capacity, compared with that in FIG. 2A.

Although both the maximum load and absorbed energy can be ensured to some extent by employing a material having a high strength in a reinforcement prepared from the conventional straight tube, it is impossible to enhance the load ramp gradient, and to provide an increase in the applied load at the start of deformation, and therefore there is a limitation in the required crash capacity.

Japanese Patent Application Publication No. 04-280924 has provided a description regarding the manufacture of a curved tube as an exception of the usage of a straight tube, which is conventionally used for the reinforcement. Actually, a method for manufacturing a reinforcement is also disclosed, wherein a straight steel pipe is heated by directly supplying an electric current thereinto and then quenched by injecting cooling water thereto, as well as by pressing it onto a mold so as to obtain a desired shape for a curved steel pipe.

However, the door guard beam described in Japanese Patent Application Publication No. 04-280924 is invented by paying attention to the fact that each door of automobiles in most cases has a specific roundness in association with the design of an automobile, and the pipe has only to be curved by fitting it to the roundness of the door. Accordingly, the above specification aims to provide a well-designed automobile, so that the door guard beam described in Japanese Patent Application Publication No. 04-280924 pertains merely to the reinforcement produced by a straight tube.

Moreover, in the door guard beam described in Japanese Patent Application Publication No. 04-280924, it is not aimed either to increase the applied load at the start of deformation, or to increase the maximum load, or further to increase the absorbed energy by using a curved pipe, as will be described below.

In addition, as for the door guard beam disclosed in Japanese Patent Application Publication No. 04-280924, a method for producing such a door guard beam is restricted to the process where a straight pipe is directly heated up by supplying an electric current and is cooled by injecting cooling water under the condition that it is pressed onto a bending mold. In such a method, it is impossible to uniformly cool and quench the tube over the whole length, thereby causing a possible unevenness to generate in the quenching.

As a result, in the door guard beam produced with the bending process in Japanese Patent Application Publication No. 04-280924, there is a possibility that an instability in the quality results from the generation of the unevenness in the quenching, and further the precision in the size and/or the shape cannot be obtained due to the uneven deformation, thereby making it impossible to use it as a finished product.

SUMMARY OF THE INVENTION

It is an object of the present invention to provide a metal tube for reinforcing car body and a car body reinforcement produced therewith, wherein both the metal tube and the reinforcement have an excellent crash capacity, which are capable of reducing the weight of the reinforcement and of increasing the applied load at the start of deformation in case of a car body collision, along with an improved characteristic of the energy absorption, compared with the conventional reinforcement having a straight tube.

To attain the above-described object, the present inventors extensively studied the behavior of deformation in car body reinforcements. The general evaluation of a reinforcement bearing a load of bending is traditionally carried out in the state of three-point bending where it is bent under a condition either of the free support or of the constrained support at both ends thereof.

However, from the above-mentioned results of investigation, it follows that the behavior of deformation in a reinforcement cannot be well evaluated in the three-point bending state on the basis of a simple free supporting, and, therefore, it is found that the constraint of the reinforcement in the axial direction must be considered.

Thus, it is found that an excellent crash capacity can be properly evaluated, using the constraint in the axial direction, when not a straight tube but a metal tube having a curved portion is employed for a car body reinforcement. In the following description, the metal tube having a curved portion is referred to as "curved tube".

In contrast thereto, a door impact bar, which is one of the automobile reinforcements, has brackets at both ends, depending on the situation, and it is jointed to the door frame via hinges and door blocks, as shown in FIG. 1.

The door frame has such a structure wherein the expanding deformation in the front and rear direction is constrained by the car body, and therefore it is difficult to perform the expanding deformation in the front and rear direction. On the contrary, the contracting deformation of the door frame in the front and rear direction is not constrained by the car body.

Similarly, the door impact bar is constrained by the door frame and therefore the expanding deformation in the front and rear direction is strongly constrained by the door frame. Hence, the deformation of the car body reinforcement cannot be properly evaluated by means of the analysis, based on the three-point bending test in such a simple free support. Accordingly, a method capable of evaluating the deformation of the car body reinforcement in an actual state is required.

FIG. 3 illustrates schematic drawings of an apparatus for analyzing the deformation of a metal tube used in a car body reinforcement: FIG. 3A is the arrangement of the apparatus, based on the three-point bending test in a free support state, and FIG. 3B is the arrangement of the apparatus, based on the three-point bending test in constrained support at both ends.

The test apparatus shown in FIG. 3A is equipped with receiving elements 13, each of which is coupled to a support column 11 fixed on the base via a link 12. A bending test tube (metal tube) 7 is placed on the receiving elements 13, attaching extra length 14 at both ends of the car body reinforcement to be tested, and a striker 10 having both a load cell and a displacement meter, which are both not shown, is pressed onto the test piece 7 to measure the load and the displacement during deformation.

The test apparatus shown in FIG. 3B is constituted such that it further includes stoppers 15 for constraining the tube ends of the car body reinforcement. The structural arrangement provides a test apparatus for three-point bending in constrained support at both ends, and an actual behavior of deformation in a metal tube can be evaluated, using the test apparatus.

FIG. 4 illustrates diagrams showing the obtained results of the three-point bending test for either a straight tube or a curved tube as a test tube, using the test apparatus shown in FIG. 3A. In this case, FIG. 4A shows a change in the load subjected by the striker relative to the displacement (mm) of the striker, whereas FIG. 4B shows a variation of the absorbed energy represented by an integration of the load sustained by the striker relative to the displacement (mm) of the striker.

The test tube had the following dimensions; an outside diameter of 31.8 mm, a thickness of 1.8 mm and a length of 1000 mm. The given tensile strength was 1500 MPa and the degree of curve $\eta$ for the curved tube was 0.167% (radius of curvature, 5000 mm). The definition of the degree of curve $\eta$ will be described later.

From the results shown in FIG. 4, it follows that the load applied to the striker increases with an increase in the displacement of the striker and gradually decreases after arriving at the maximum. Such a decrease in the load appearing in the course of the displacement of the striker results from the fact that the test tube cannot bear the load due to the flattening or buckling. Regarding the load ramp gradient, the maximum load and the absorbed energy, no appreciable difference was found between the tested straight tube and the tested curved tube.

FIG. 5 illustrates diagrams showing the obtained results of the three-point bending test for either the straight tube or a curved tube as a test piece, using the test apparatus shown in FIG. 3B. In this case, FIG. 5A shows the change in the load sustained by the striker relative to the displacement (mm) of the striker, whereas FIG. 5B shows the change of the absorbed energy represented by the integration of the load sustained by the striker relative to the displacement (mm) of the striker.

The test tube had the following dimensions; an outside diameter of 31.8 mm, a thickness of 1.8 mm and a length of 1000 mm, and the given tensile strength was 1500 MPa. Furthermore, the selected degree of curve η was 4.720%, 0.167%, and 0.042% three types (the corresponding radius of curvature being 1000 mm, 5000 mm and 10,000 mm).

From the results shown in FIG. 5, it follows that the behavior of deformation obtained from the straight tube is substantially the same as that in FIG. 4, and no difference is discerned between the employed test apparatuses. On the contrary, an appreciable difference between the employed tests apparatuses can be found in the behavior of deformation obtained from the curved tube. In fact, when the test apparatus shown in FIG. 3B is used, the load applied onto the striker abruptly increases at the start of deformation and the load ramp gradient significantly increases, and then decreases after arriving at the local maximum. Thereafter, a similar behavior of deformation to that in the straight tube is appreciated.

FIG. 6 illustrates drawings for explaining the behavior of deformation for a curved tube. FIG. 6A shows the curved tube 7 in the state just after it is initially set. FIG. 6B shows the curved tube 7 in the state when it becomes straight in the course of deformation. FIG. 6C shows the curved tube in the state of a further advanced deformation. Finally, FIG. 6D shows the curved tube in the state after it is buckled in the middle position.

The curved tube 7 has an arc length of S1 along the tube in FIG. 6A and an arc length of S2 along the tube in FIG. 6B. Since the curved tube 7 is constrained at both ends thereof by stoppers 15, a relation of S1>S2 holds. Accordingly, a compressive stress is applied to the curved tube 7 along the tube in the course of deformation from the state shown in FIG. 6A to that shown in FIG. 6B, so that an excess load is required to deform the curved tube 7 with the striker 10.

An increased degree of curve η for the curved tube 7 causes the load ramp gradient to be increased for the load in the initial deformation, thereby enabling the applied load to be increased at the start of deformation. As a result, it is possible to increase the absorbed energy.

In other words, an employment of a curved tube for a car body reinforcement allows the load to be increased at the start of deformation, thereby making it possible to increase the absorbed energy, and further to significantly enhance the crash capacity.

Moreover, when a car body reinforcement is constituted by using the above-mentioned curved tube, it is preferable either to provide a proper strength to the joint portions at both ends of the curved tube, or to dispose brackets having a proper strength at both ends of the tube. In the case of incomplete constraint in the axial direction at both ends of the tube, there is a possibility that the applied load can not be increased at the start of deformation, thus making it impossible for the absorbed energy to be increased.

In addition to the above-described knowledge, the present inventors have clarified that the proper strength against buckling can be effectively obtained by using a circular, elliptic or similar shape of the cross section for a metal tube for reinforcing car body, and that it is efficient to form a curved portion either over the entire length of the metal tube or partially, with a combination of a successive local heating using a high frequency heating, a successive incremental bending process and a successive follow-on uniform cooling.

On the basis of the above-described knowledge, the present invention is proposed, wherein the following features (1) and (2) pertain to a metal tube for reinforcing car body, and the following features (3) to (5) pertain to a car body reinforcement.

(1) A metal tube for reinforcing car body, which is mounted onto the car body of an automobile in a two-end support structure to ensure superior crash capacity, characterized in that it has a curved portion extending over the entire longitudinal length or a local longitudinal length, characterized in that, when the degree of curve η is defined by (S−L)/L×100(%), where S (mm) is the arc length of the curved portion, and L (mm) is the projection length which is determined by projecting the curved portion from the outer periphery to the inner periphery, the degree of curve η is not less than 0.002%, and characterized in that, when a curved portion is formed for the metal tube, the work tube to be processed is successively moved in the axial direction thereof, and the work tube is locally heated at a plastically deformable temperature, using a high frequency heating coil disposed above the outer periphery of the work tube, and then the work tube is rapidly cooled after a bending moment is applied to the heated portion to form the curved portion incrementally.

(2) In a metal tube for reinforcing car body according to the above feature (1), it may be specified that the ratio of the load ramp gradient of said metal tube to that of the straight tube is not less than 1.25, when the three-point bending test in constrained support at both ends is applied. And it is preferable that the sectional profile of said metal tube exhibits a circular shape or an elliptic shape or a shape similar thereto.

(3) A car body reinforcement, characterized in that, by jointing the ends of the metal tube for reinforcing car body according to the above feature (1) or (2) to the car body, the outer periphery of the curved portion in said metal tube is aligned substantially in the direction of impact applied to the car body.

A car body reinforcement according to the invention is constituted by one or more metal tubes for reinforcing car body mounted onto the structure of each component in the car body in order to protect occupants in a automobile in case of collision, and the reinforcement is applicable, for instance, to a door impact bar, front bumper beam, rear bumper beam, cross member reinforcement, front pillar reinforcement, center pillar reinforcement, side sill or the like.

(4) In a car body reinforcement according to the above feature (3), it is preferable that the metal tube for reinforcing car body has brackets for jointing to the car body at both ends thereof. When it is used as a door impact bar, the bracket can be formed as a flat bracket or a step bracket or a hinge-unified bracket.

(5) In a car body reinforcement according to the above features (3) and (4), it is preferable that the compression resistance strength Fb (kN) of either of the metal tube for reinforcing car body at an end thereof or of said brackets satisfies the following inequality (1):

$$Fb > 5\eta^{0.4} \tag{1}$$

where the degree of curve η is specified in the description of the above feature (1).

The metal tube for reinforcing car body according to the invention is not merely restricted to a steel tube, but it can be also extended to a stainless tube, titanium alloy tube, aluminum alloy tube, magnesium alloy tube or the like.

By implementing above features (1) to (5), the metal tube for reinforcing car body and the car body reinforcement according to the invention allow the load ramp gradient, the maximum load and the absorbed energy to be further increased in the collision of a car body, compared with the conventional reinforcement including a straight tube. In particular, an increase in the load ramp gradient as for the load characteristic at the start of deformation allows an excellent crash capacity to be provided for reinforcing the car body.

Hence, the metal tube for reinforcing car body and the car body reinforcement according to the invention make it possible to reduce the dimensions (the outside diameter and the thickness) of the metal tube for reinforcing car body, preserving the crash capacity in an adequate level, and further to reduce the weight of the car body by reconsidering the shape thereof, along with the reduction of manufacturing cost, resulting in that the requirements increasing more and more as for the crash capacity of the car body can be satisfied.

BRIEF DESCRIPTION OF THE DRAWINGS

FIG. 3 illustrates schematic drawings each showing the constitution of an apparatus for analyzing the deformation of a metal tube used in a car body reinforcement.

FIG. 6 illustrates drawings for explaining the behavior of deformation in a curved tube.

DETAILED DESCRIPTION OF THE PREFERRED EMBODIMENTS

In the following, the subject matter specified by the present invention will be described, classifying it into a metal tube for reinforcing car body and a car body reinforcement.

1. Regarding the Metal Tube for Reinforcing Car Body

The metal tube for reinforcing car body according to the invention is a metal tube, which is mounted onto a car body of an automobile in such a manner that it is supported thereto at both ends to suppress the collision shock, and which metal tube has a curved portion extending either over the entire length thereof or over a partial length.

FIG. 7 illustrates drawings for explaining the degree of curve η, which specifies the shape of a curved portion in a metal tube for reinforcing car body according to the invention. FIG. 7A shows a metal tube 7 having a curved portion extending in a constant radius of curvature over the entire length thereof. FIGS. 7B and 7C show metal tubes 7 having curved portions, each of which has a varying radius of curvature, depending on the axial position thereof. FIG. 7D shows a metal tube 7 having a partially curved portion.

When an arc length of a curved portion along the tube axis is S (mm), and the projection length determined by projecting the curved portion from the outer periphery to the inner periphery thereof is L(mm), the degree of curve can be expressed by the following equation (2):

$$\text{Degree of curve } \eta = (S-L)/L \times 100(\%) \quad (2)$$

Figure 2A:
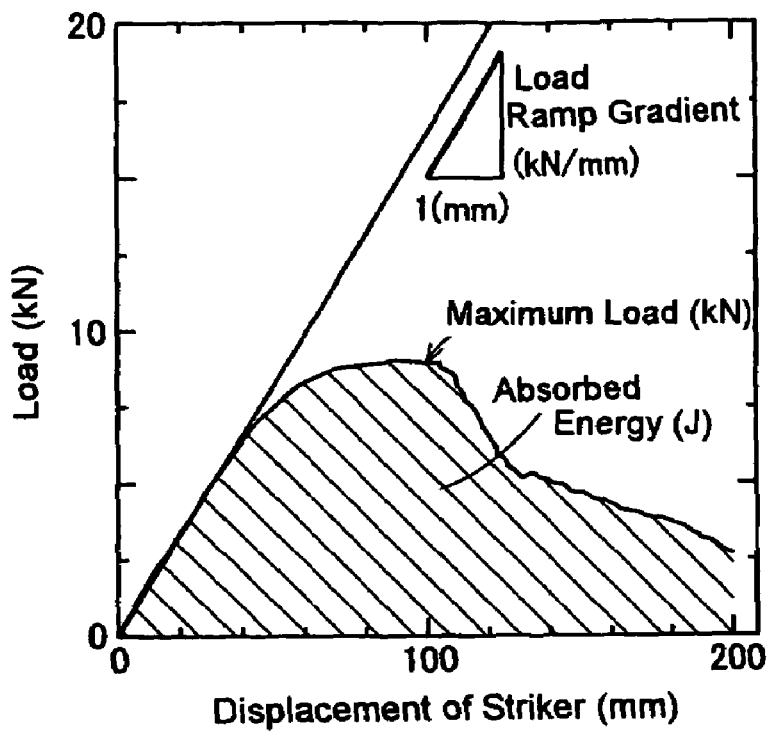
FIG. 2 illustrates diagrams showing the relationship between the displacement of a striker and the load in the three-point bending test of a steel tube (supported at both ends) to explain the collision property.
Figure 2B:
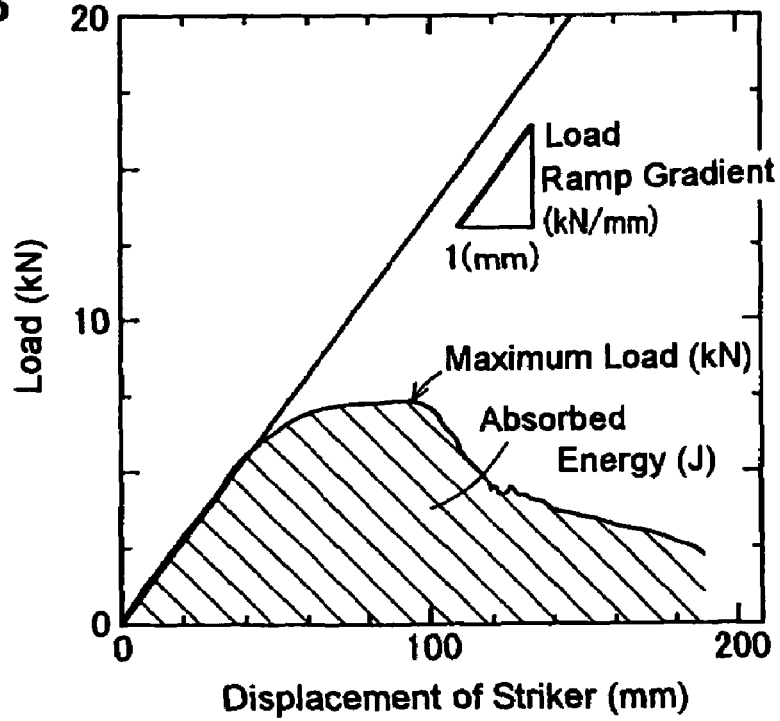
Figure 8:
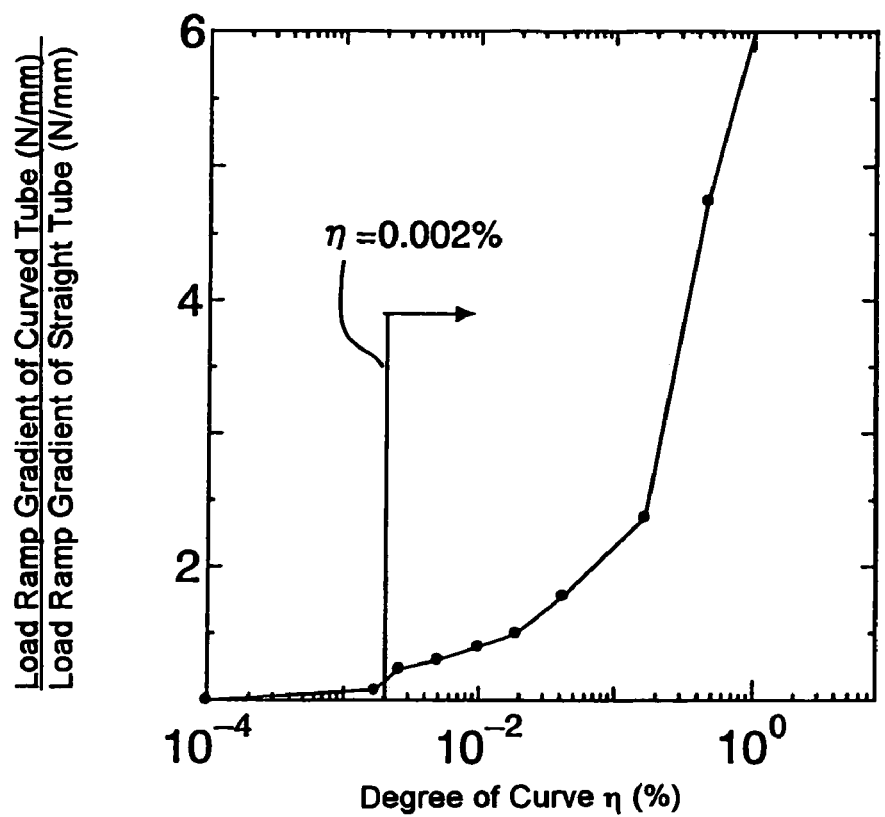
FIG. 8 is a diagram showing a change in the ratio of the load ramp gradient of a curved tube to that of a straight tube when the degree of curve η in the curved tube is varied.

FIG. 8 is a diagram showing a change in the ratio of the load ramp gradient of a curved tube to that of a straight tube when the degree of curve η in the curved tube is varied. In this case, the load ramp gradient represents a characteristic of the applied load at the start of deformation, as already described, referring to FIG. 2.

From the relationship shown in FIG. 8, it is found that the load ramp gradient strongly depends on the degree of curve η, and significantly increases with an increase of the degree of curve η in the curved tube. On the basis of this characteristic, it will be described that the utilization of a curved tube allows both the maximum load and the absorbed energy to be enhanced.

Figure 9:
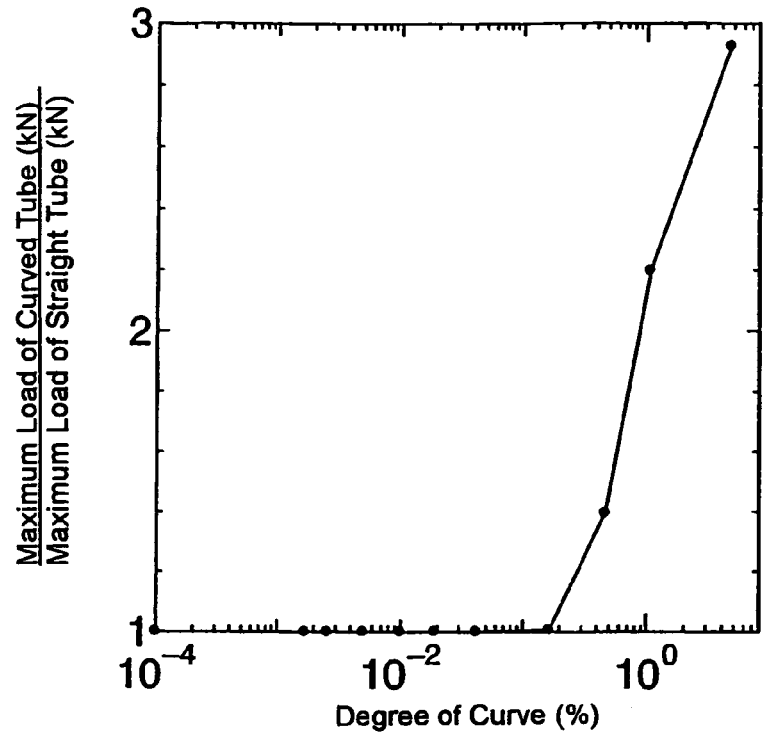
FIG. 9 is a diagram showing a change in the ratio of the maximum load of a curved tube to that of a straight tube when the degree of curve η in the curved tube is varied.

FIG. 9 is a diagram showing a change in the ratio of the maximum load of a curved tube to that of a straight tube, when the degree of curve η in the curved tube is altered. The maximum load indicated therein is expressed by the ratio of the maximum load (kN) of a curved tube to the maximum load (kN) of a straight tube, in which case, these are obtained, using the three-point bending test apparatus shown in FIG. 3B.

Figure 10:
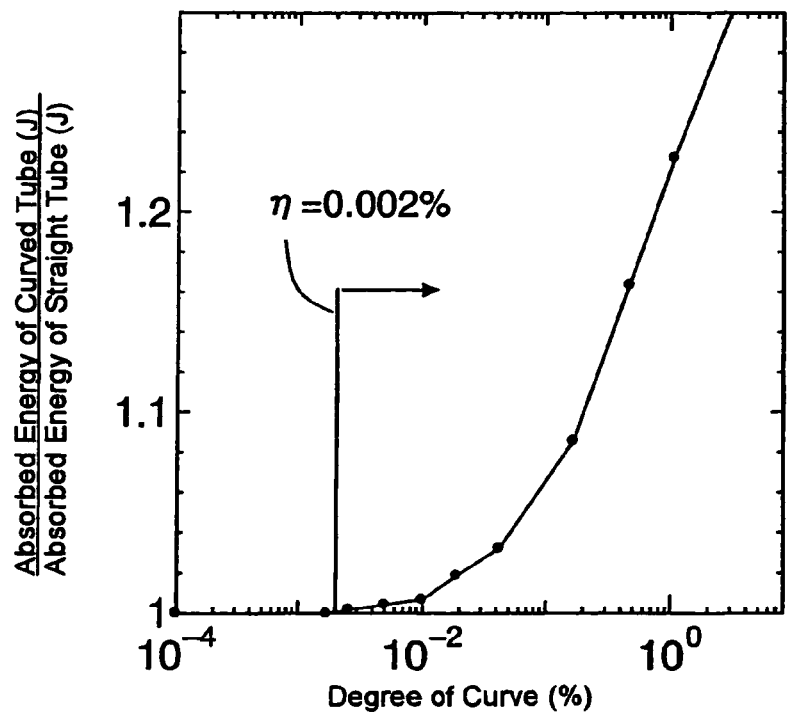
FIG. 10 is a diagram showing a change in the ratio of the absorbed energy of a curved tube to that of a straight tube when the degree of curve η in the curved tube is varied.

FIG. 10 is a diagram showing a change in the ratio of the absorbed energy of a curved tube to that of a straight tube, when the degree of curve η in the curved tube is altered. The absorbed energy indicated therein is expressed by the ratio of the absorbed energy (J) of a curved tube to the absorbed energy (J) of a straight tube, in which case, these are obtained, using the three-point bending test apparatus shown in FIG. 3(b).

As shown in FIGS. 8 and 10, the effect resulting from the constraint at the ends of the tube becomes prominent with an increase in the degree of curve η of the curved tube, along with an increase in the applied load at the start of deformation, thereby enabling the absorbed energy to be increased. To be concrete, in the metal tube for reinforcing car body according to the invention, it is preferable to set the degree of curve η of the metal tube at an amount of not less than 0.002% in order to increase the absorbed energy as well as the load ramp gradient.

In order to efficiently increase both the maximum load and the absorbed energy in a metal tube for reinforcing car body, it is preferable to select a suitable property of the material, along with an optimization of the sectional profile of the metal tube, as will be described below. That is, when the strength of the used material is high, the maximum load and the absorbed energy in bending deformation are increased.

When further taking into account the weight reduction of a metal tube, it is preferable to select a tensile strength of not less than 1300 MPa for the strength, more preferably 1470 MPa class or more, which can be reliably obtained in the current industrial technology. Moreover, in the case such a wider range of plastic deformation must be made most of as for the car body reinforcement for a door, it is preferable to provide the total elongation of the metal tube with not less than 7%.

(Sectional Profile of the Metal Tube for Reinforcing Car Body)

As described above, it is required that the weight of components in an automobile is further reduced, so that it is preferred that the thickness of the components is reduced as thin as possible. However, it is important to ensure a predetermined bending strength and a predetermined absorbed energy in order to secure a preferred crash capacity, and it is also important to provide the resistance to flattening deformation in the course of the bending deformation in order to secure a preferred buckling strength in case of collision.

From such a viewpoint, it is preferable to provide a circular shape, an elliptic shape or a shape similar thereto in the sectional profile of the metal tube for reinforcing car body according to the invention.

FIGS. 11 and 12 show sectional profiles, which are applicable to the metal tube for reinforcing car body according to the invention. FIGS. 11A to 11E exemplifies circular or elliptic shapes in the sectional profile, which provide stability against buckling in the peripheral direction of cross-section, and ensure a large deformation in the usage thereof without any sudden reduction in the strength for the deformation.

Figure 11A:
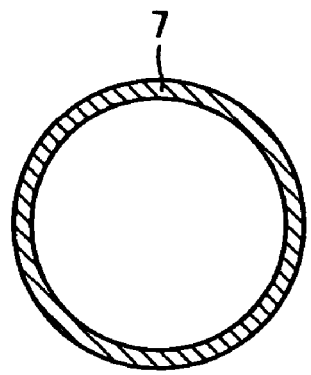
FIG. 11 illustrates the sectional profiles, which are applicable to a metal tube for reinforcing car body according to the invention, wherein circular or elliptic profiles are exemplified.
Figure 11B:
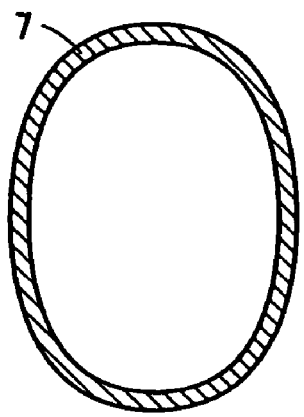
Figure 11C:
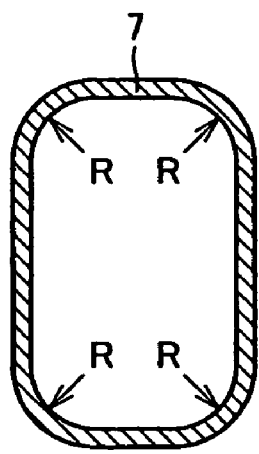
Figure 11D:
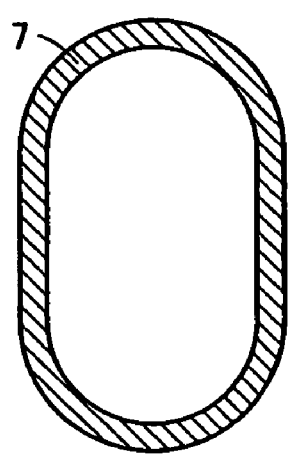

FIG. 11C shows a rectangular shape having a round portion R in each of four corners, and FIG. 11D shows an oval-type shape. In these two cases, the cross section has two straight portions in the longer sides, thereby enabling the rigidity to be enhanced for bending load.

Figure 11E:
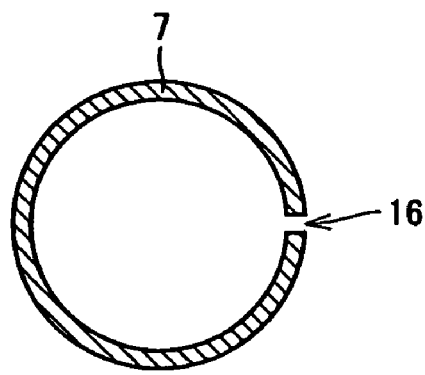

FIG. 11E shows another example of a circular cross section. In this case, the metal tube for reinforcing car body 7 is formed by an open tube having a slit 16 extending over the entire longitudinal length, so that brackets each having a flat surface can easily be formed in one-piece structure at both ends of the tube by opening and expanding the slits 16. The usage of a metal tube for reinforcing car body having such a sectional profile as shown in FIG. 11E makes it possible to save the welding process required in the tube production, thereby enabling the manufacturing cost to be reduced, along with the assurance of predetermined crash capacity.

Figure 12A:
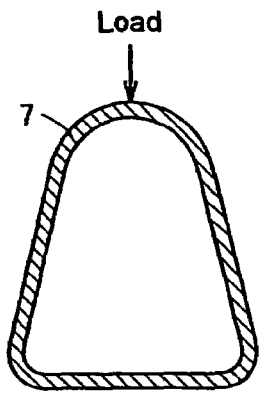
FIG. 12 illustrates the sectional profiles, which are applicable to a metal tube for reinforcing car body according to the invention, wherein profiles similar to circular or elliptic cross sections are exemplified.

FIGS. 12A to 12E show examples of sectional profile similar to a circular or an elliptic shape. The bell-type shape of the sectional profile shown in FIG. 12A is obtained by deforming a circular shape, and it has a round portion R in pressing direction, the radius of which is smaller than that in a round tube, thereby enabling the characteristic of buckling resistance to be enhanced. Moreover, a rectangular shape of the sectional profile on the other side causes the section modulus to be increased, hence making it possible to increase the maximum load.

Figure 12B:
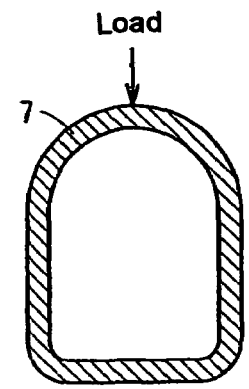

FIG. 12B shows a semi-cylindrical shape, which has a straight portion on each of the longer sides as well as a straight portion on the side opposed to the surface receiving a load, thereby making it possible to enhance the characteristic of buckling resistance and therefore to greatly enhance the rigidity for bending load.

Figure 12C:
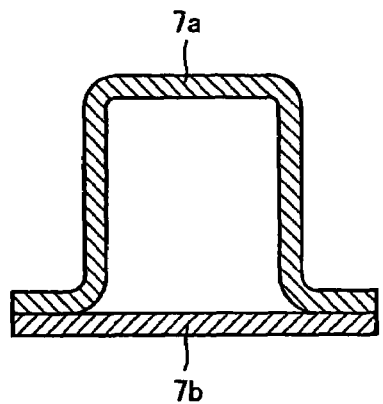
Figure 12D:
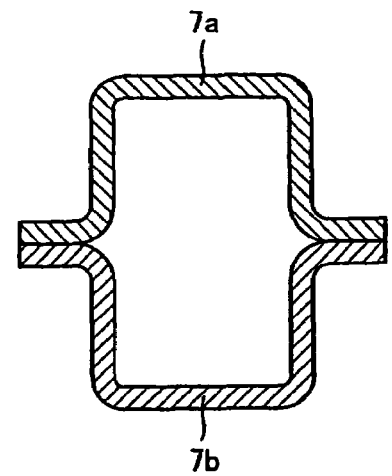

FIGS. 12C and 12D show closed cross section shapes, each of which is produced by welding press-moldings 7a and 7b. Such a shape ensures a predetermined crash capacity and it is applicable either to a metal tube having different shapes in the longitudinal direction or to a metal tube having a complicate sectional profile.

Figure 12E:
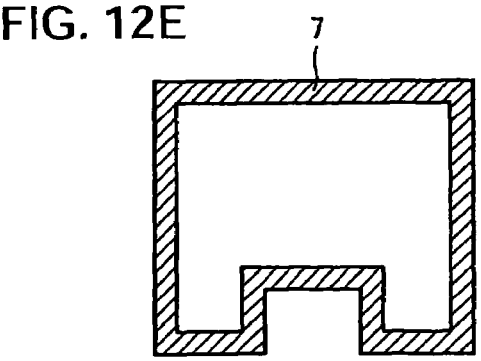

FIG. 12E shows another example of a closed cross section shape having a complicate profile. This cross section can be used preferably in such a restricted shape resulting from the constraint of the space for mounting, as in a bumper beam, center pillar reinforcement or the like.

(Incremental Local Heating in Succession, Successive Incremental Bending Process and Successive Incremental Follow-on Cooling of a Metal Tube for Reinforcing Car Body)

In the metal tube for reinforcing car body according to the invention, various methods for bending the tube to make a curved tube can be employed. For instance, a press bending, stretch bending, compressive bending, roll bending, push-through bending, eccentric plug bending process or the like is applicable.

When a metal tube having such a high strength as a tensile strength above 1000 MPa is used, it is important to take the above-mentioned bending processes into account. Generally, a metal tube having a tensile strength of 500-700 MPa as an initial material is used to be bent, and then a heat treatment is applied thereto to enhance the strength, thereby enabling a metal tube having higher strength to be produced.

Meanwhile, severe requirements as for the crash capacity of the current car body will be expected for a curved tube in the same quality level as for a straight tube. If, therefore, the method for producing a metal tube having a high strength by the heat treatment after bending of an initial material is employed, as proposed in Japanese Patent Application Publication No. 04-280924, where a straight pipe is heated by directly supplying an electric current thereto and then quenched over the entire length thereof, it is difficult to ensure uniform curved shape due to the generation of non-uniform residual strain.

Further, as afore-mentioned, when taking into account the weight reduction of a metal tube, it is preferable to select a tensile strength of not less than 1300 MPa for the strength, more preferably 1470 MPa class or more. However, as a metal tube having such a high strength is likely to be subjected to delayed fracture in presence of residual stress of a certain level or more, it is imperative that residual stress after processing is to be kept minimal so as to be applied for a car body reinforcement. In case the cold bending process is applied as afore-mentioned, the residual stress due to processing is generated; by the method as proposed in Japanese Patent Application Publication No. 04-280924, the residual stress is generated due to uneven cooling. Accordingly, it is determined that, when a curved portion is formed for a metal tube, a work tube is locally and incrementally heated in succession using a high frequency heating coil disposed above the outer periphery of the work tube, and then the locally heated portion thereof is incrementally bent in succession, followed by incremental quenching by rapid cooling in succession, thereby enabling to suppress the generation of residual stress as well as to obtain a predetermined high strength. As a result, since bending deformation is performed in hot working condition, the generation of spring back resulting from the residual stress does not take place and the plastic deformation easily undergoes without requiring large bending force. Moreover, the freezing of the shape by the rapid cooling just after bending causes an excellent accuracy to be provided in preserving the shape, and the successive follow-on cooling of the locally heated portions over the entire periphery surface prevents the generation of unevenness in quenching, thereby making it possible to ensure a stable quality of product by providing almost neither unexpected ensuing deformation nor non-uniform strength, which result from the residual stress caused by the unevenness in heating and cooling.

For instance, in case a steel tube is bent, said steel tube as a work tube to be processed is incrementally heated in succession to the temperature of not less than $A_3$ transformation point, but not above the temperature where grain coarsening gets to take place, and then the heated portion is plastically, incrementally bent by using a specific device, followed by incremental successive cooling by injecting water or other coolant liquid, or air, toward the outside or toward both outside and inside of the work tube, which enables to ensure the cooling rate of 100° C./sec or more.

It should be noted that, as the steel tube thus bent is evenly cooled, said steel tube well maintains the curved shape as being frozen along with homogeneous hardness distribution, being assured of no significant residual stress generated, despite that high strength is obtained, and exhibiting excellent resistance to delayed fracture. In designing material composition at this occasion, the metal element, for instance, such as Ti (titanium), B (boron) or the like, that enhances hardenability, can be contained, thereby enabling to obtain the steel tube having much higher strength, homogeneous hardness distribution and excellent resistance to delayed fracture.

Meanwhile, in bending method that is applied to the present invention, hot working process is applied using a work tube having a low strength as an initial material, followed by quenching in order to increase the strength, which results in obtaining an in-process tube having a high strength. Further, the in-process tube having a high strength as quenched above, is bent under hot working condition, and is followed by second quenching, thereby enabling the microstructure thereof to have fine grain and enabling to obtain the final metal tube having much more superior crash capacity.

Consequently, in the present invention, the employment of the incremental local heating, an incremental bending and follow-on incremental cooling in succession makes it possible to satisfy such severe requirements on the crash capacity of the car body, even if the metal tube for reinforcing car body is formed to have a curved portion.

Figure 13:
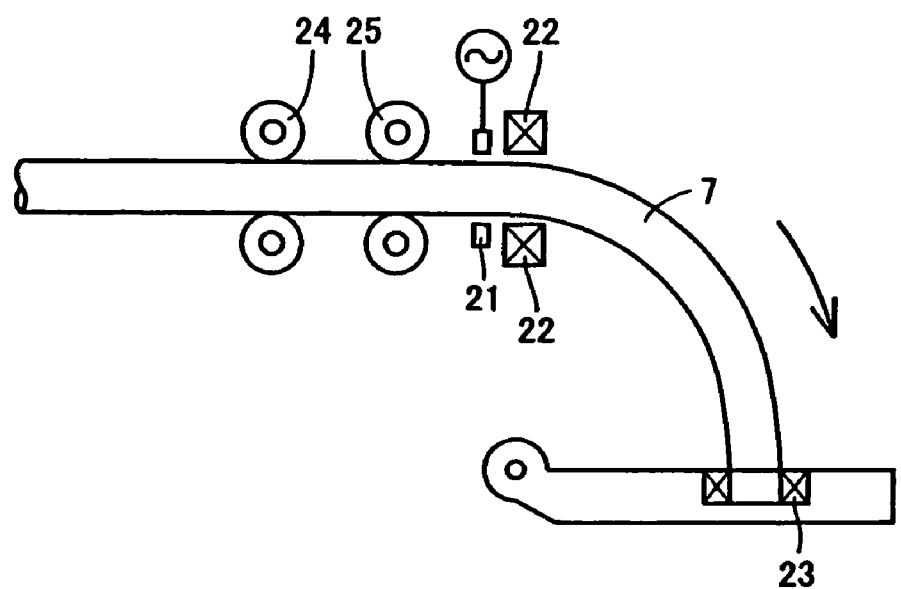
FIG. 13 is a schematic sectional view of an arrangement in a high frequency bending process apparatus, which is used to form a curved portion for a metal tube for reinforcing car body according to the invention.

FIG. 13 is a schematic drawing showing the arrangement of a high frequency induction bending process apparatus, which is used to form a curved portion for a metal tube for reinforcing car body according to the invention. In FIG. 13, the structural arrangement of such an apparatus clamping the tube at one end thereof is exemplified.

In this case, an annular induction-heating coil 21 is disposed above the peripheral area of a work tube 7 where a curved portion is to be formed, and therefore the work tube 7 can be locally heated in succession to a plastically deformable temperature. Subsequently, the bending moment is applied to the work tube by a clamp 23 at one end thereof, while the heating portion is relatively moved in the axial direction of the tube. Thereby, a curved portion having a predetermined degree of curve η is incrementally formed in succession, and thereafter the portion is incrementally quenched in succession by injecting cooling water from a cooling apparatus 22 thereto. The work tube 7 is held by guide rollers 24 and 25 before carrying out the induction heating.

The metal tube having the curved portion formed by such a method is capable of ensuring an excellent precision in the shape as well as an excellent stability in the quality, and therefore guarantees stringent requirements as for the crash capacity of the car body. Also, even in case the bending process is carried out by using a work tube having a low strength as an initial material, uniform quenching can enhance the strength, thereby enabling to obtain a metal tube having the tensile strength of 1300 MPa or more, further the metal tube equivalent to 1470 MPa class or more.

2. Regarding the Car Body Reinforcement

The car body reinforcement according to the invention is characterized in that the joints of the respective ends of a metal tube for reinforcing car body to the car body allow the curved portion of the metal tube to be arranged on the outer peripheral side such that it is aligned substantially with the direction of impact applied to the car body.

In the car body reinforcement according to the invention, a metal tube for reinforcing car body is equipped with brackets at the respective ends thereof, and the joints of the brackets allow the curved portion of the metal tube to be arranged on the outer peripheral side such that it is aligned substantially with the direction of impact applied to the car body. It can be stated that the joint of the metal tube for reinforcing car body to the car body is achieved either by the structural arrangement including brackets, or by the structural arrangement without any bracket.

Figure 1:
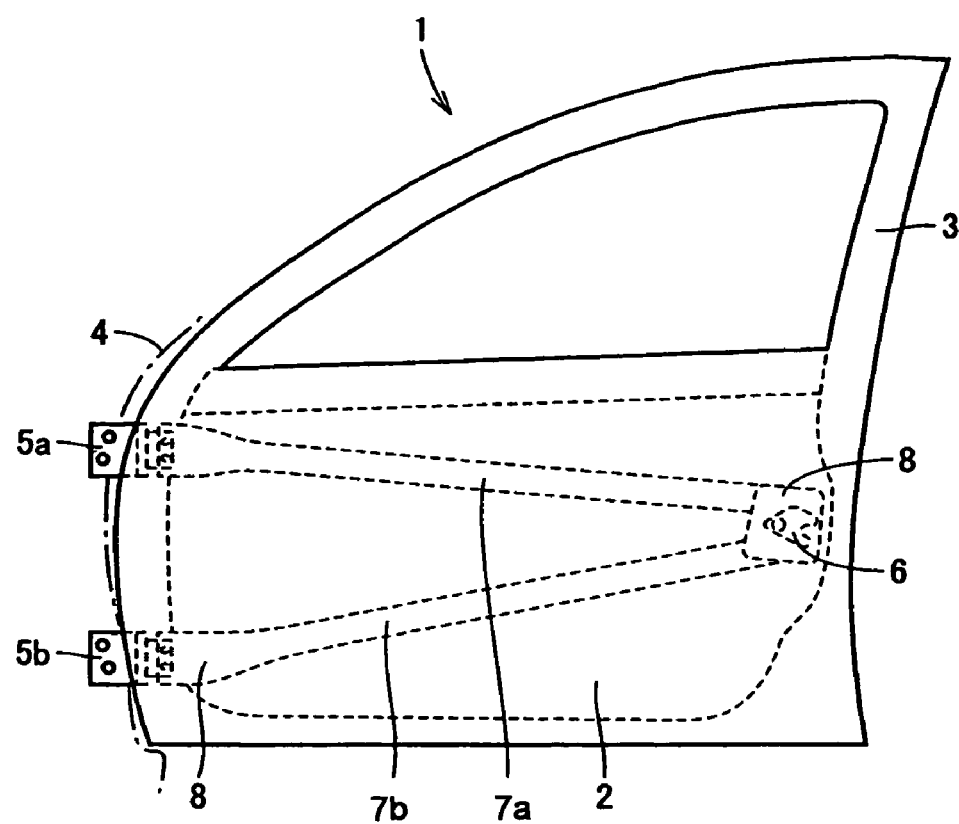
FIG. 1 is a drawing showing a car body structure, wherein reinforcements are used as door impact bars for a door of an automobile.
Figure 14A:
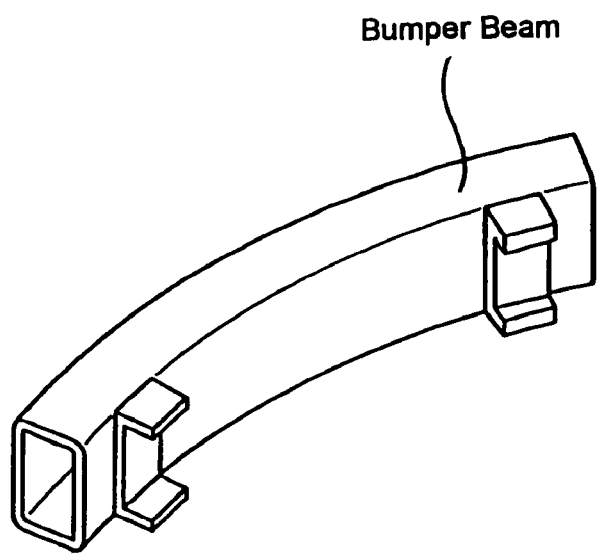
FIG. 14 illustrates perspective views of a bumper beam and cross member reinforcement, which are both used as a car body reinforcement to protect vehicle occupants in case of a collision.
Figure 14B:
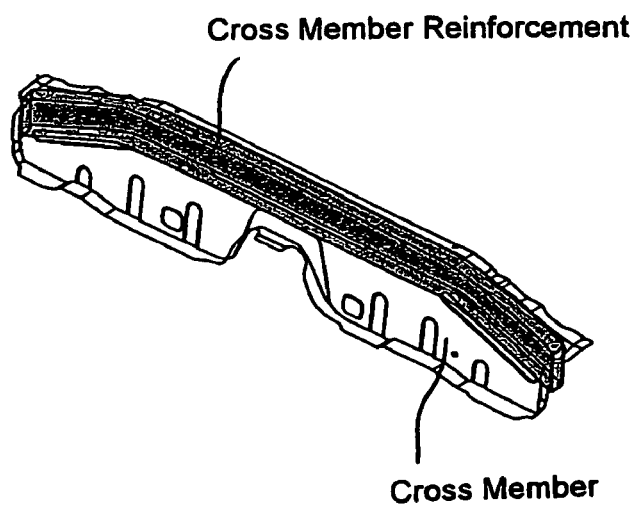
Figure 15A:
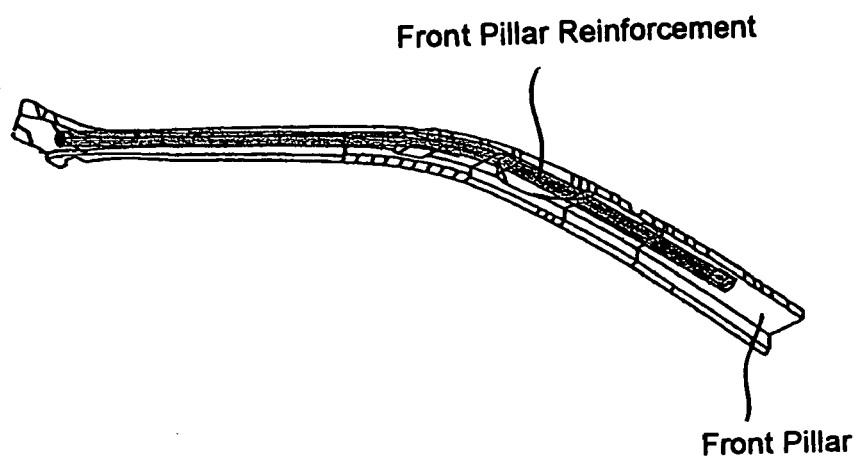
FIG. 15 illustrates drawings showing the structural feature of a front pillar reinforcement and center pillar reinforcement, which are both used as a car body reinforcement to protect vehicle occupants in the case of a collision.
Figure 15B:
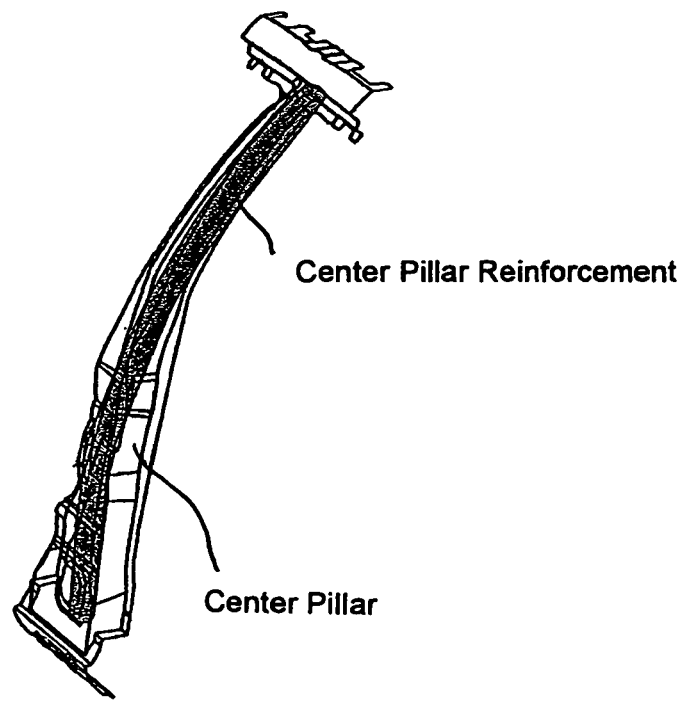

As described above, in order to protect occupants in case of collision, the car body reinforcement according to the invention can be used, for instance, as a bumper beam (FIG. 14(a)), a cross member reinforcement (FIG. 14(b)), a front pillar reinforcement (FIG. 15(a)), a center pillar reinforcement (FIG. 15(b)) and a side sill, along with a door impact bar shown in FIG. 1.

The car body reinforcement according to the invention has an anisotropic characteristic, being distinguished from the case for the straight tube, so that it is necessary to make use of the directional characteristic thereto so as to obtain the most efficient feature of the curved portion when the car body reinforcement is mounted onto the door or the like in the car body. When the car body reinforcement according to the invention is used, for instance, as a door impact bar, it is preferable to mount the member on the outer peripheral side of the curved portion in the metal tube, that is, to mount the member such that the curving direction thereof substantially aligns with the direction toward the door side.

Moreover, a door in an automobile has a smaller curvature with respect to the front and rear direction of the car body and a greater curvature with respect to the up and down direction of the car body. When, therefore, the metal tube has a relatively larger degree of curve η, the arrangement of the reinforcement along the front and rear direction of the door provides an ineffective space. In such a case, the reinforcement shall be obliquely mounted with the utmost attention such that it is aligned along the curved surface of the door, thereby making it possible to efficiently use the inner space of the door.

Figure 16A:
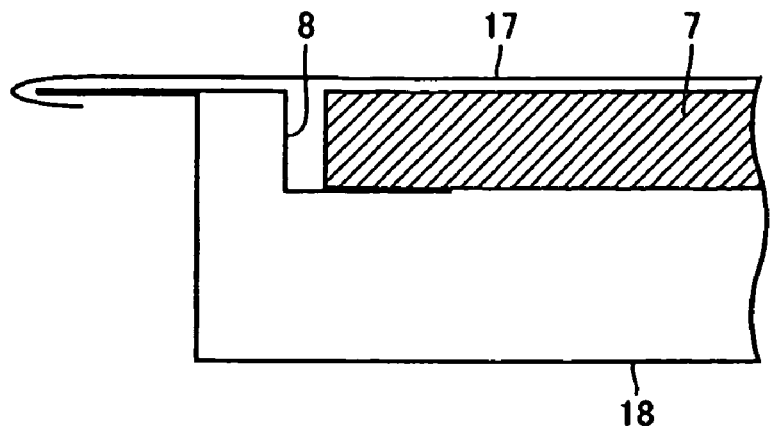
FIG. 16 illustrates drawings for explaining the constitution of a bracket, which is applicable to the case that a car body reinforcement according to the invention is used as a door impact bar including brackets.

FIG. 16 illustrates drawings for explaining the arrangement of a bracket, which is applicable when a car body reinforcement according to the invention is used as a door impact bar having such a bracket. FIG. 16A shows the structural feature of a flat bracket. In this case, the bracket 8 is inserted between a door outer panel 17 and a door inner panel 18, and the reinforcement 7 is fixed to the bracket 8 by means of the spot welding or the like.

Figure 16B:
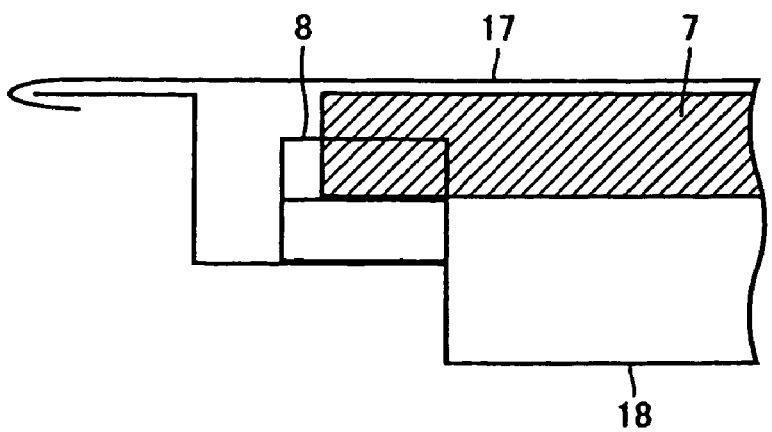

FIG. 16B shows the structural feature of a step-shaped bracket. In this case, the bracket having a leg is welded to a door inner panel 18.

Figure 16C:
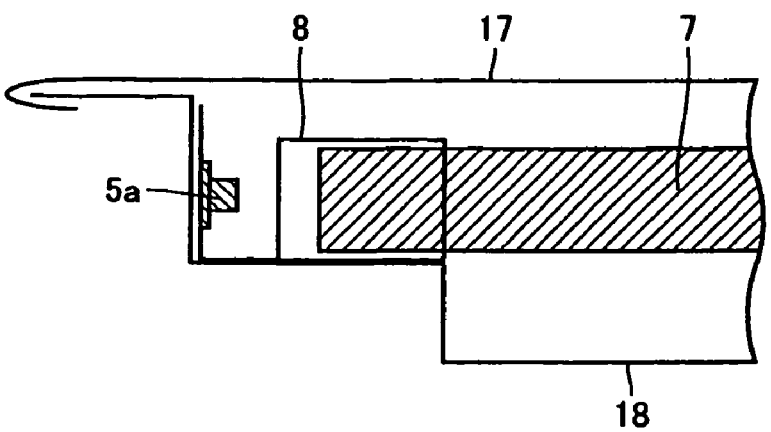

FIG. 16C shows the structural feature of a hinge-unified bracket. In this case, the bracket 8, to which a hinge mounting nut 5a is formed in one-piece, is welded to a door inner panel 18.

FIG. 17 illustrates drawings for explaining the arrangement when a car body reinforcement according to the invention is used as a door impact bar without any bracket. FIG. 17A shows the structural feature of a reinforcement 7, which is fixed to a door inner panel 18 by means of the spot welding. FIG. 17B shows the structural feature of a reinforcement 7, which is fixed to a door inner panel 18 by fastening with a bolt and nut 19. Furthermore, FIG. 17C shows the structural feature of a reinforcement 7, one end of which is fixed to a door inner panel 18 by means of the stud welding.

Figure 17A:
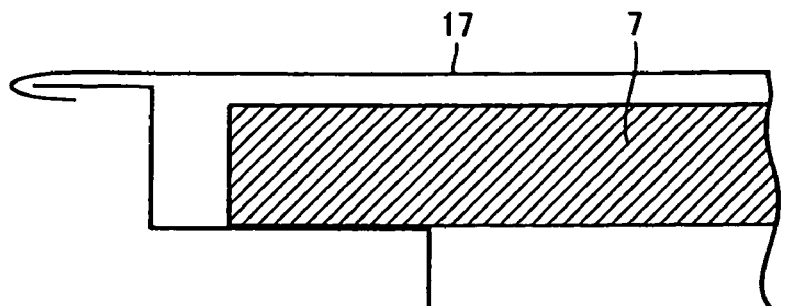
FIG. 17 illustrates drawings for explaining the constitution of a bracket, which is applicable to the case that a car body reinforcement according to the invention is used as a door impact bar including no brackets.
Figure 17B:
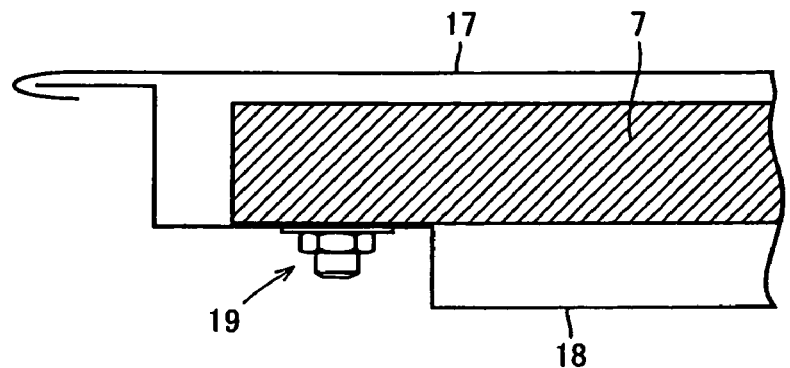
Figure 17C:
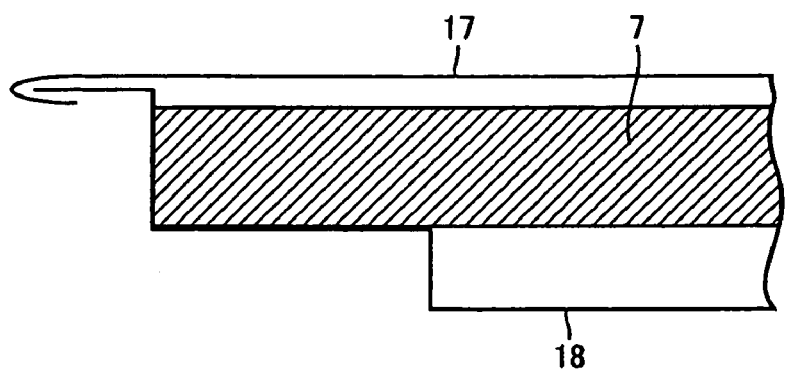
Figure 17D:
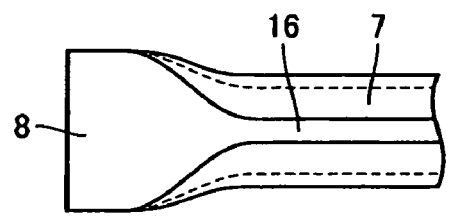

FIG. 17D shows the structural feature of a car body reinforcement in which the ends of the metal tube are formed in one-piece configuration. By combining the metal tube 7 having a slit 16 extending over the entire longitudinal length shown in FIG. 11E with the reinforcement, the tube ends thus formed in one-piece ensure a preferable crash capacity and further make it possible to save the welding work as well as to reduce the manufacturing cost. As shown in FIG. 17A or FIG. 17B, the tube ends thus formed in one-piece can be fixed to the door inner panel 18 either by means of the spot welding or by fastening with bolts and nuts 19.

The car body reinforcement according to the invention is equipped at both ends thereof, either with the tube ends for connecting the metal tube for reinforcing car body to the car body thereof, or with the brackets. As a result, the tube ends or brackets in the tube ends bear the compressive load, which generates when a curved tube becomes straight in deformation, as shown in FIG. 6. Consequently, on enhancing the bending property of a curved tube, it is important that the tube ends or brackets of such a metal tube for reinforcing car body bear the compressive load.

Figure 3A:
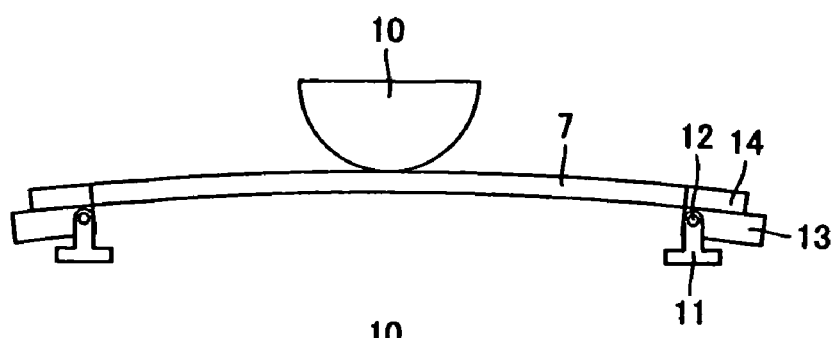
FIG. 3A shows the constitution of the free support three-point bending test apparatus.
Figure 3B:
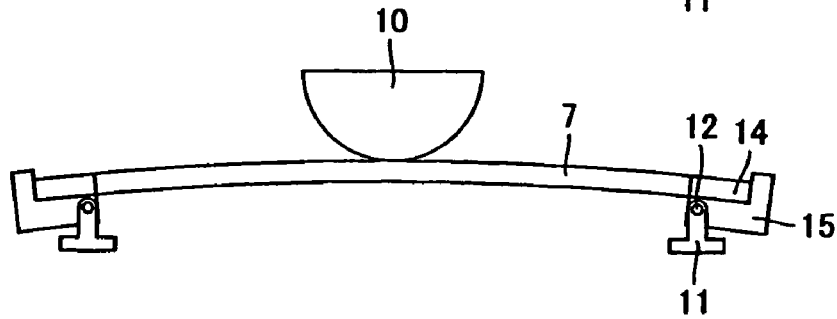
FIG. 3B shows the constitution of the three-point bending test apparatus in the constrained support at both ends.
Figure 4A:
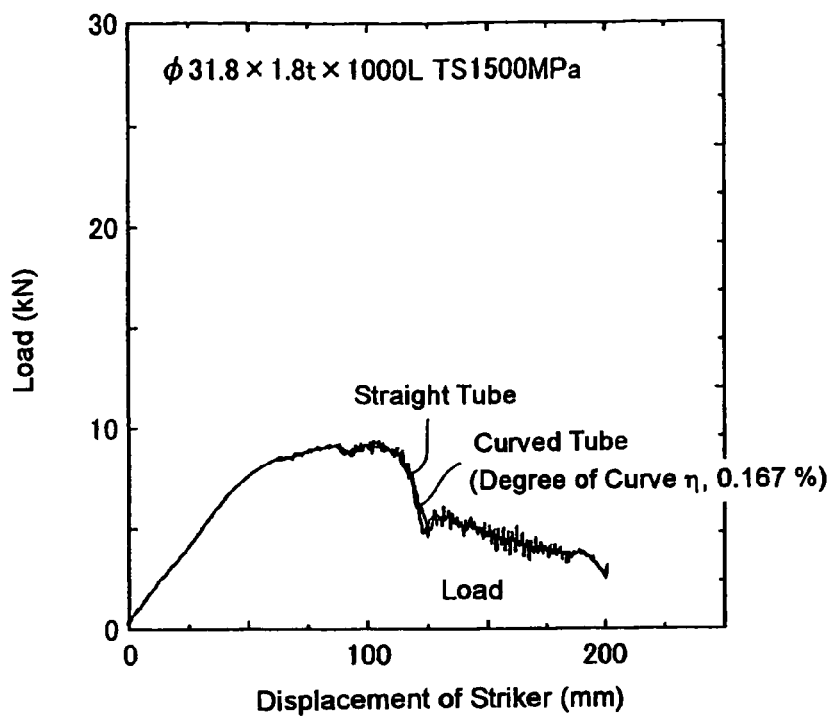
FIG. 4 illustrates diagrams showing the results obtained in the three-point bending test for a straight tube and a curved tube used respectively as a test tube, using the test apparatus shown in FIG. 3A.
Figure 4B:
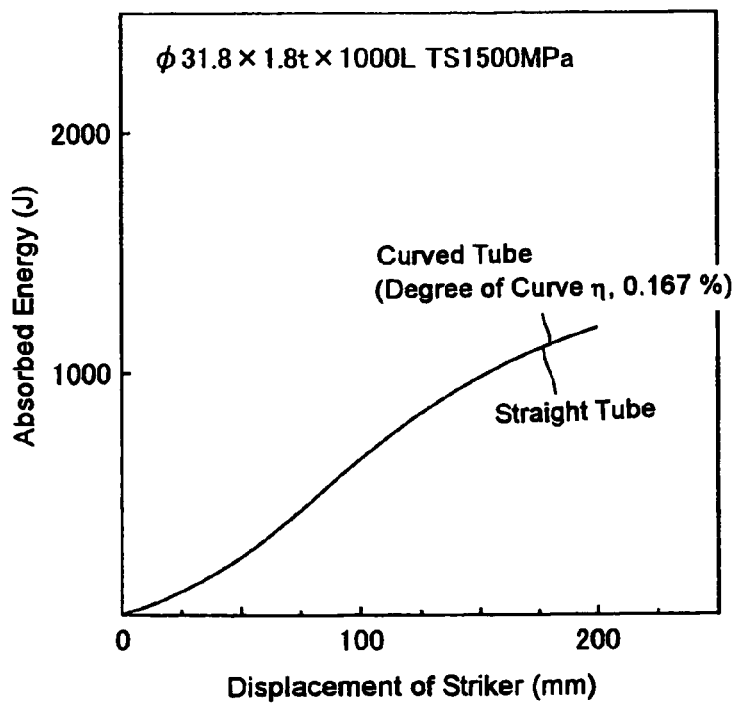
Figure 5A:
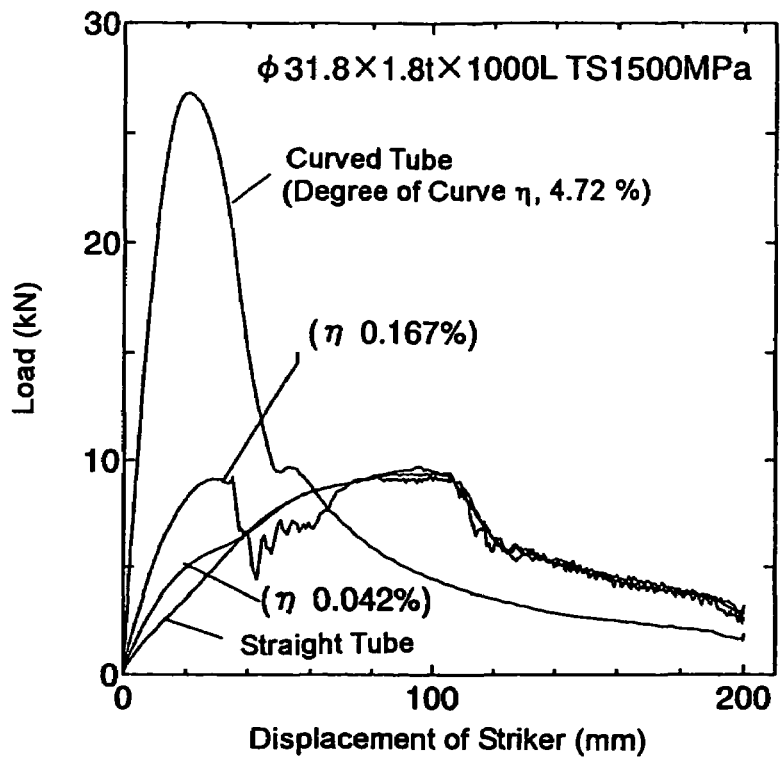
FIG. 5 illustrates diagrams showing the results obtained in the three-point bending test for a straight tube and a curved tube used respectively as a test tube, using the test apparatus shown in FIG. 3B.
Figure 5B:
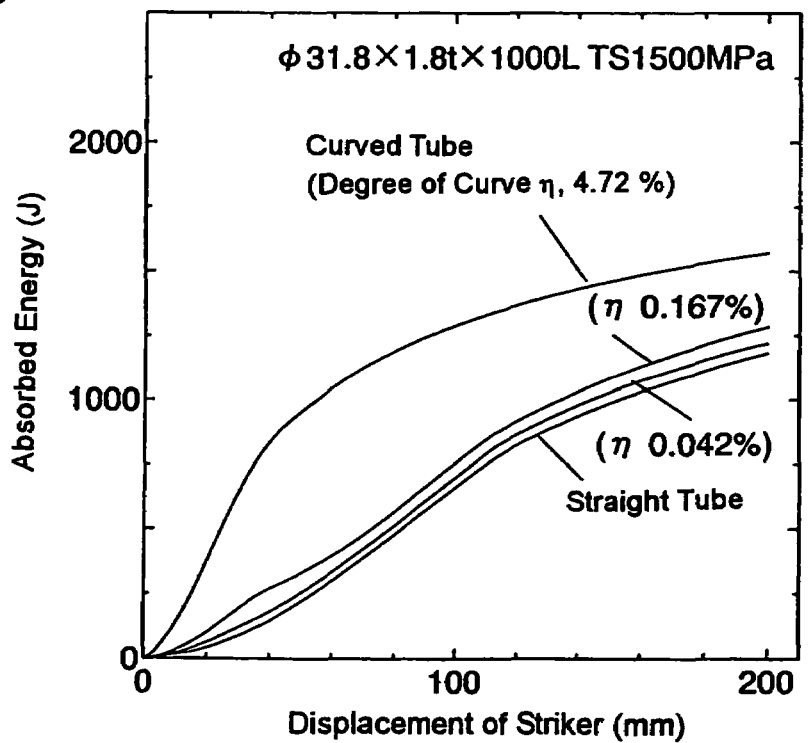
Figure 6A:
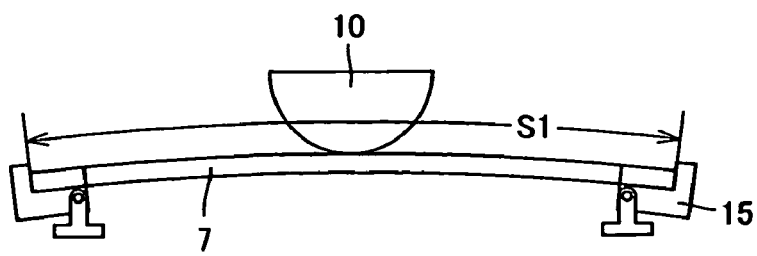
FIG. 6A shows the state just after the curved tube is set.
Figure 6B:
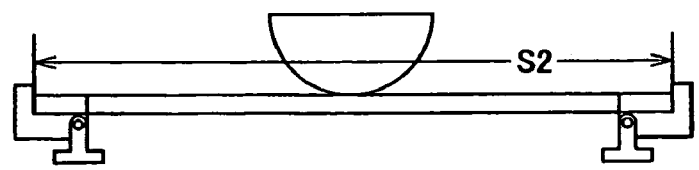
FIG. 6B shows the state where the curved tube becomes straight in the course of deformation.
Figure 6C:
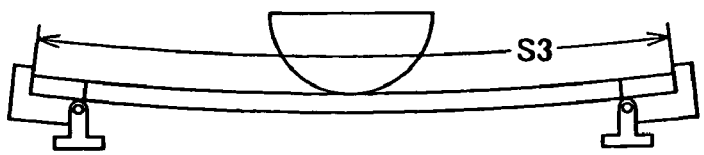
FIG. 6C shows the state of a further advanced deformation.
Figure 6D:
FIG. 6D shows the state where the tube is buckled in the middle position.
Figure 18:
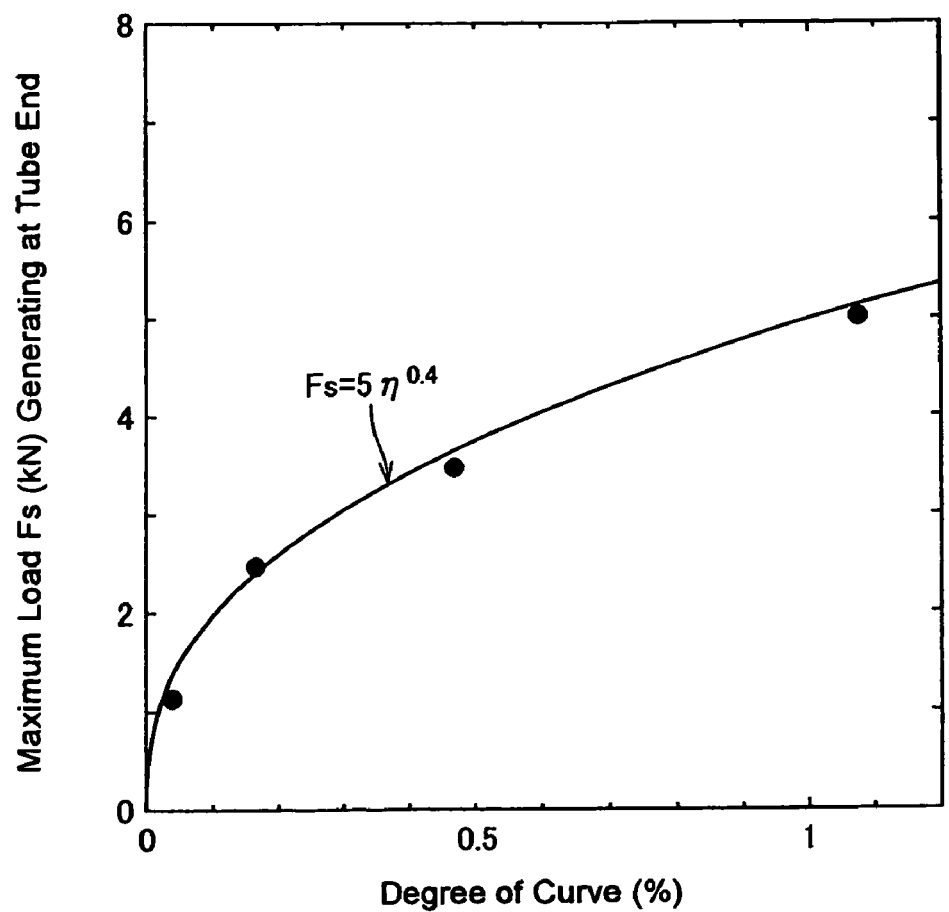
FIG. 18 is a diagram showing the relationship between the degree of curve η and the maximum load generating at both ends of a curved tube, when a three-point bending test apparatus shown in FIG. 3B is used.

FIG. 18 is a diagram showing the relationship between the degree of curve η and the maximum load generating at one end of a curved tube, which is obtained, using the three-point bending test apparatus shown in FIG. 3B. As shown in FIG. 18, the maximum load Fs generating at the tube end increases with an increase in the degree of curve η of the curved tube. The following equation (1') can be obtained as for the relationship:

$$Fs = 5\eta^{0.4} \tag{1'}$$

As described above, the tube end or the bracket of the metal tube for a car body reinforcement has to bear the maximum load Fs. Accordingly, in order to avoid the buckling and/or the plastic deformation and/or a sharp bend resulting from the compressive stress, it is preferable that the tube end or the bracket satisfies the compression resistance strength Fb (kN), which can be expressed by the following inequality (1):

$$Fb > 5\eta^{0.4} \tag{1}$$

In this case, the compression resistance strength Fb (kN) expressed by the above inequality (1) means a strength at which neither buckling nor plastic deformation due to the compressive stress take places in the tube ends or the brackets, or a strength at which no damage generates in the welded portion.

EXAMPLES

Example 1

In order to ascertain the effect obtainable from the metal tube for reinforcing car body according to the invention, work tubes as an initial material having chemical composition represented by 0.22% C-1.20% Mn-0.20% Cr-0.02% Ti-0.0015% B-balance of Fe and having a low strength (YP: 450 MPa, TS: 555 MPa, EL: 23%) were processed to be test samples that have the dimension of outside diameter, thickness, length and the degree of curve listed in Table 1 along with the after-bending-deformation strength of 1470 MPa class. The microstructure was mainly consisted of martensite and bainite structure.

With regard to bending deformation process, a work tube is locally heated at 950° C. by a high frequency induction heating, and then is subjected to successive incremental hot bending process, followed by successive incremental rapid cooling with cooling water at a cooling speed of 300° C./sec. The degree of curve η in the curved tubes thus produced is varied within the range from 0.0017% to 4.720%, and the tensile strength of any tube was above 1500 MPa. Straight tubes having a tensile strength of higher than 1500 MPa, which was identical with that of the curved tubes, were also prepared for the sake of comparison.

Using the test samples thus prepared, i.e., the curved tubes and straight tubes, the bending test was carried out for a span of 1000 mm, employing a three-point bending test machine shown in FIG. 3B, and the load ramp gradient, the maximum load and the absorbed energy were determined. The respective ratio of the load ramp gradient, the maximum load and the absorbed energy for the curved tube to those for the straight tube are shown in Table 1.

Figure 7A:
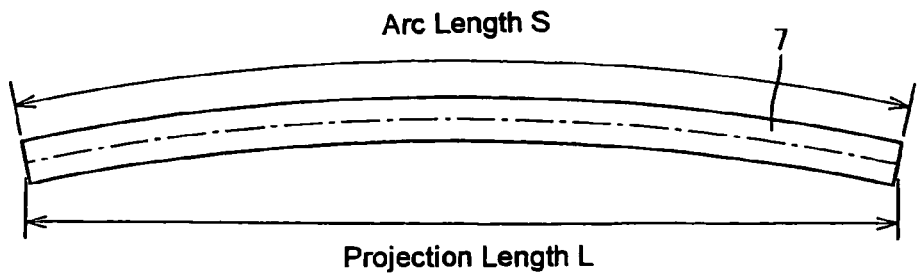
FIG. 7 illustrates drawings for explaining the degree of curve η, which specifies the shape of a curved portion in a metal tube for reinforcing car body according to the invention.
Figure 7B:
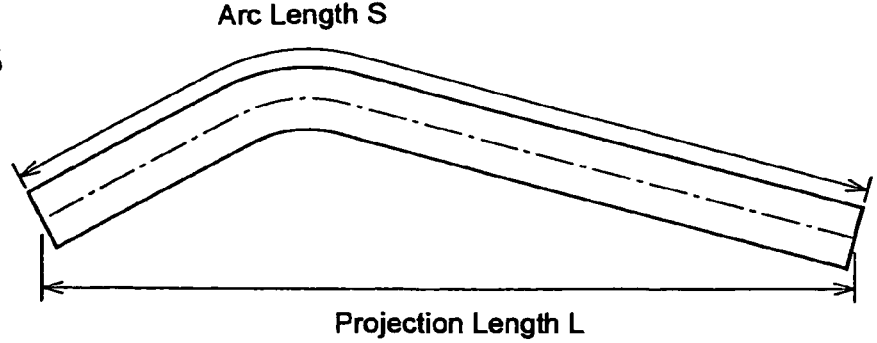
Figure 7C:
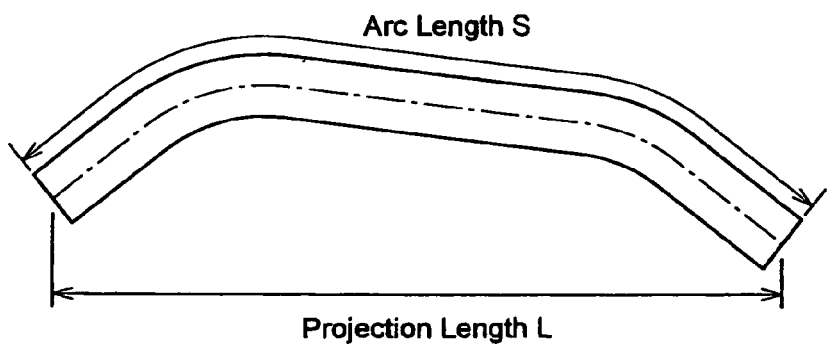
Figure 7D:
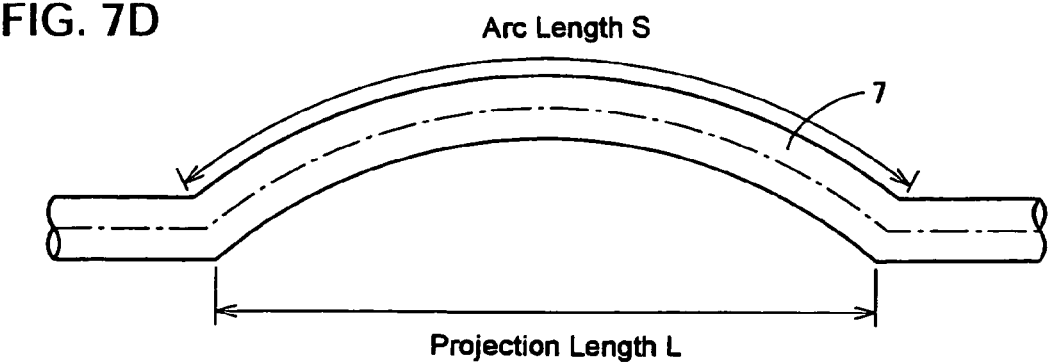

Shape A shown in Table 1 denotes the curved tubes having a curved portion over entire length as described in FIGS. 7A-B, Shape B denotes the curved tubes having a curved portion over a partial length as described in FIG. 7D, and Shape C denotes the straight tube as Comparative example.

It is found that, in any case the degree of curve η is not less than 0.002%, the ratio of the load ramp gradient of the curved tubes to that of the straight tube becomes 1.25 or more, which show the load ramp gradient is significantly enhanced for the curved tube, compared with that for the straight tube, and therefore a preferable characteristic for the crash capacity can be obtained.

TABLE 1

| | | | Dimension of Test Sample | | | | Ratio as to Straight Tube | | |
| | | | | | | | Load Ramp | | |
| Test No. | Classification | Shape | Outside diameter mm | Thickness mm | Length mm | Degree of Curve % | Gradient (N/mm)/ (N/mm) | Maximum Load (kN)/(kN) | Absorbed Energy (J)/(J) |
|---|---|---|---|---|---|---|---|---|---|
| 1 | Inventive Example | A | 31.8 | 1.8 | 1000 | *0.0017 | 1.03 | 1.00 | 1.00 |
| 2 | Inventive Example | A | 31.8 | 1.8 | 1000 | 0.0026 | 1.25 | 1.00 | 1.00 |
| 3 | Inventive Example | B | 31.8 | 1.8 | 1000 | 0.0046 | 1.30 | 1.00 | 1.00 |
| 4 | Inventive Example | A | 31.8 | 1.8 | 1000 | 0.010 | 1.40 | 1.00 | 1.01 |
| 5 | Inventive Example | B | 31.8 | 1.8 | 1000 | 0.019 | 1.50 | 1.00 | 1.02 |
| 6 | Inventive Example | A | 31.8 | 1.8 | 1000 | 0.042 | 1.78 | 1.01 | 1.03 |
| 7 | Inventive Example | A | 31.8 | 1.8 | 1000 | 0.167 | 2.37 | 1.01 | 1.09 |
| 8 | Inventive Example | A | 31.8 | 1.8 | 1000 | 4.720 | 9.06 | 2.93 | 1.33 |
| 9 | Comparative Example | C | 31.8 | 1.8 | 1000 | *0.000 | 1.00 | 1.00 | 1.00 |

Note:
Symbol * on Table 1 means the departure from a desirable range in the comparative and inventive examples.

Note:
Shape A (a curved tube having a curved portion over entire length), Shape B (a curved tube having a curved portion over a partial length), Shape C (straight tube)

Example 2

In case a metal tube for reinforcing car body according to the present invention is subjected to bending deformation, various material characteristics comprising, namely, tensile strength, microstructure, hardness distribution, curved shape preservation, flattening property, residual stress and resistance to delayed fracture were examined in detail. Various work tubes as initial material having the dimension of 31.8 mm in outside diameter and 2.3 mm in thickness, and having the chemical composition comprising 0.22% C-1.20% Mn-0.20% Cr-0.02% Ti-0.0015% B-balance of Fe are prepared, wherein the strength level is varied. Work tubes thus prepared were subjected to bending deformation to be curved tubes for test samples that were provided for the examination of various material characteristics. The strength level of work tubes, bending parameters and the strength level of test samples along with the microstructure were shown on Table 2.

TABLE 2

| Test No | Classification | Mechanical Property of Work Tube | | | Bending Process (heating - bending - cooling) | Mechanical Property of Test Sample (after bending) | | | |
|---|---|---|---|---|---|---|---|---|---|
| | | YP MPa | TS MPa | EL % | | YP MPa | TS MPa | EL % | Microstructure |
| 10 | Inventive example | 450 | 555 | 23 | Incremental heating & bending - rapid cooling | 1215 | 1639 | 13 | M + B |
| 11 | Inventive example | 1205 | 1625 | 12 | Incremental heating & bending - rapid cooling | 1203 | 1633 | 12 | M + B |
| 12 | Comparative example | 450 | 555 | 23 | Incremental heating & bending - slow cooling | 358 | 462 | 42 | F + P |
| 13 | Comparative example | 450 | 555 | 23 | Cold bending | 485 | 593 | 20 | F + P |
| 14 | Comparative example | 1205 | 1625 | 12 | Cold bending | 1205 | 1644 | 11 | M + B |
| 15 | Comparative example | 450 | 555 | 23 | Entire-length heating & bending - rapid cooling | 1240 | 1686 | 12 | M + B |
| 16 | Comparative example | 450 | 555 | 23 | Entire-length heating & bending - slow cooling | 345 | 455 | 43 | F + P |
| 17 | Comparative example | 1205 | 1625 | 12 | Entire-length heating & bending - rapid cooling | 1235 | 1677 | 13 | M + B |

Note:
Symbol in the column "microstructure"; M denotes martensite structure, likewise B denotes bainite, F denotes ferrite, and P denotes pearlite, respectively.

(1) Bending Parameters, Mechanical Property et al of Test Sample

Figure 19:
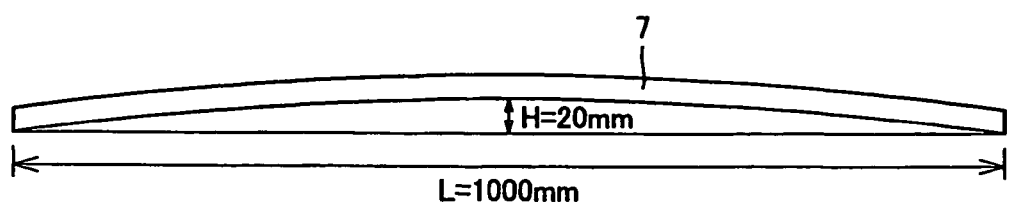
FIG. 19 is a diagram showing the aimed curved shape in producing embodiment examples as for test samples.

As shown in Table 2, in relation to bending parameters, three kinds of bending process such as incremental heating accompanied by incremental bending in succession, cold bending and entire-length heating & bending were applied to prepare test samples for examination of various material characteristics. The aimed curved shape of Test No. 7, as shown in FIG. 19, comprises the length of 1000 mm, and the aimed bow clearance H (amount of curve) of 20 mm (the degree of curve: 0.107%). The bending parameters in detail were listed in Table 3.

As a result, in Test Nos. 10-12 that the incremental heating and incremental bending was applied, wherein the feed speed of work tubes was set to be 15 mm/sec, the heated portion up to 980° C. by high frequency induction heating was subjected to incremental bending, followed by cooling. With regard to cooling method, either rapid cooling down to 20° C. by water cooling or slow cooling by natural cooling in air was applied.

Figure 20:
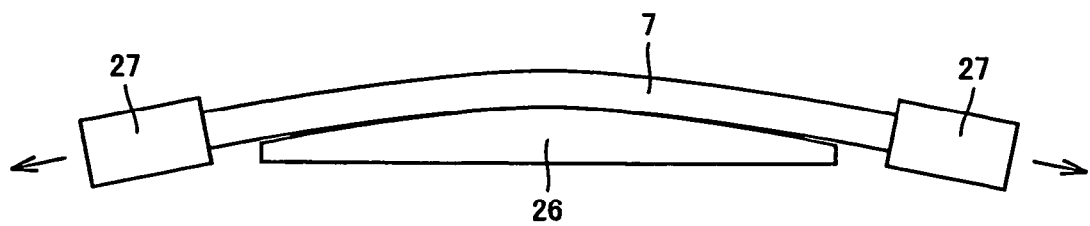
FIG. 20 is a diagram for explaining the cold bending process that is applied in producing embodiment examples.

FIG. 20 shows a diagram for explaining the cold bending process that was applied for Example 2. In Test Nos. 13 and 14, as shown in the diagram, the work tube was subjected to stretch bending in axial direction as cold in such a way that

TABLE 3

| Test No. | Classification | Feed Speed of Work Tube mm/sec | Frequency of Heating Coil kHz | Heating Temperature ° C. | Cooling Condition | | |
|---|---|---|---|---|---|---|---|
| | | | | | Classification | Flow rate of Cooling Media | Temperature of Cooling Water ° C. |
| 10 | Inventive Example | 15 | 10 | 980 | Water Cooling | 100 L/min | 20 |
| 11 | Inventive Example | 15 | 10 | 980 | Water Cooling | 100 L/min | 20 |
| 12 | Comparative Example | 15 | 10 | 980 | Slow Cooling | Natural cooling in air | — |
| 13 | Comparative Example | — | — | as cold | — | — | — |
| 14 | Comparative Example | — | — | as cold | — | — | — |
| 15 | Comparative Example | — | — | 980 | Water Cooling | 100 L/min | 20 |
| 16 | Comparative Example | — | — | 980 | Slow Cooling | Natural cooling in air | — |
| 17 | Comparative Example | — | — | 980 | Water Cooling | 100 L/min | 20 | the work tube was pressed onto a bending jig 26, while both ends of the tube was clamped by chucks 27.

Figure 21:
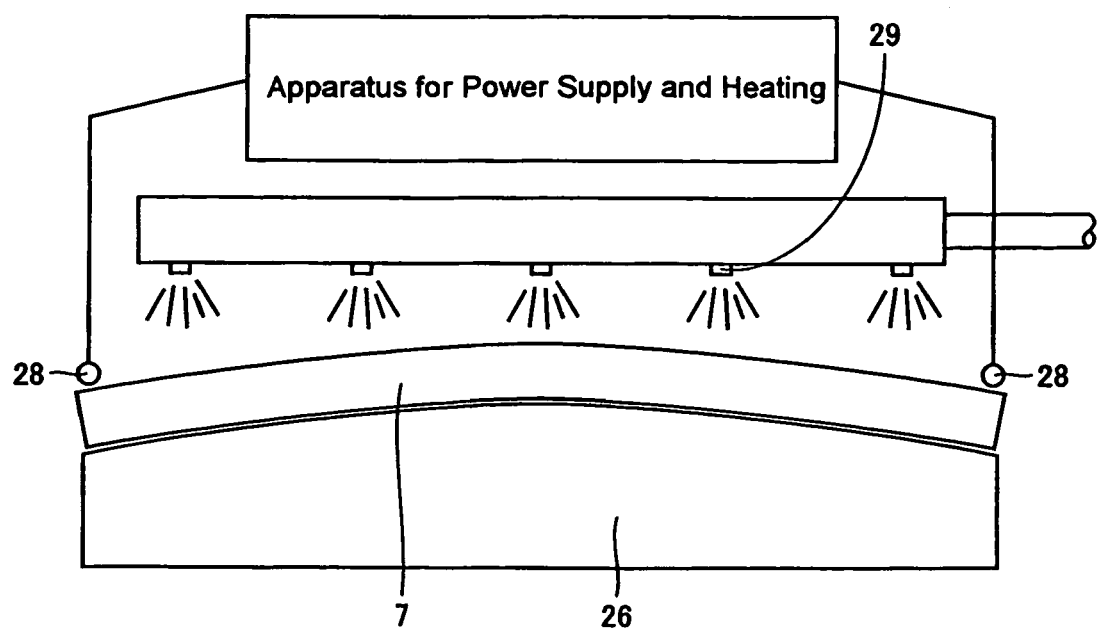
FIG. 21 is a diagram for explaining the entire-length bending process, wherein the work tube to be processed is heated over the entire length.

FIG. 21 shows a diagram for explaining the entire-length heating and bending process. In Test Nos. 15-17, as shown in the diagram, both ends of work tube was attached to connecting terminals 28 for directly supplying an electric current, the entire-length of work tube was heated, and then was subjected to press bending by a bending jig 26, followed by cooling, wherein, in case rapid cooling was applied, cooling water was injected over the outer surface of the tube 7 through the cooling nozzle 29 that was disposed at the opposite side of the bending jig 26, and wherein, in case of slow cooling, natural cooling in air was applied.

Tensile test result along with the observation result of the microstructure for test samples after bending process, were listed in above Table 2, wherein the tensile test was performed in accordance with JIS Z 2241, by using No. 11 specimen specified in JIS Z 2201, and wherein the microstructure was observed at circumferential cross section of the tube, that was subjected to nital etching, at a magnification of 500.

According to the result shown in above Table 2, in Test Nos. 10 and 11, Inventive Example, the microstructure mainly consisted of martensite and bainite structure was obtained, and the strength of 1470 MPa class was secured. However, in Test No. 12, Comparative Example, as slow cooling by natural cooling in air was applied subsequent to incremental heating and bending process, the microstructure mainly consisted of ferrite and pearlite structure was obtained so that the resultant strength could not exceed prior strength of work tube.

Figure 22:
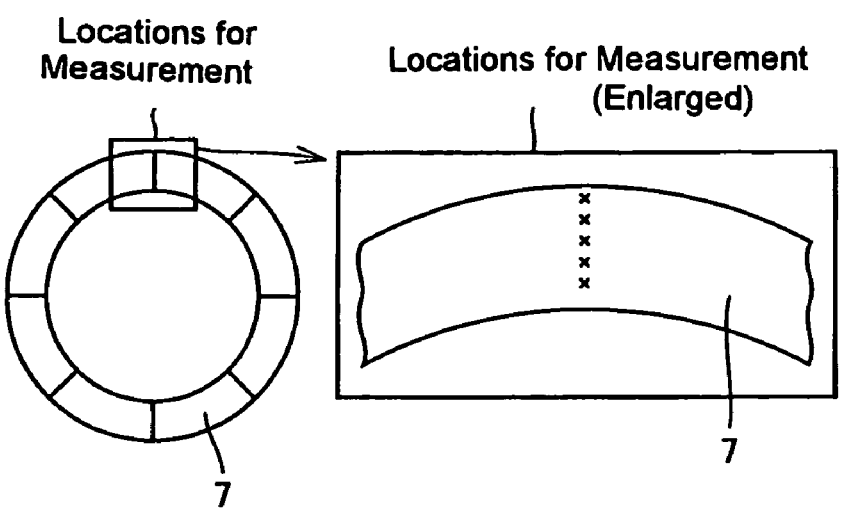
FIG. 22 is a diagram showing the measuring locations for hardness distribution by Vickers Hardness test (JIS Z 2244).

(2) Examination of Hardness Distribution, Curved Shape Preservation, Flattening Property and Residual Stress for Test Samples Table 4 shows the measurement result of hardness distribution by Vickers Hardness Test (JIS Z 2244). The applied load for indentation was 1 kg, and hardness reading was carried out at 40 locations per test sample as shown in FIG. 22, wherein five locations for each direction of eight radial directions set by 45 degree pitch were measured at circumferential cross section. When the scattering of hardness is under 30, the homogeneity of hardness distribution is evaluated as being excellent.

TABLE 4

| Test No. | Classification | Hardness Distribution Measurement | | | |
|---|---|---|---|---|---|
| | | Max. Hardness Hv (max) | Min. Hardness Hv (min) | Scattering of Hardness (max − min) | Evaluation on Homogeneity of Hardness |
| 10 | Inventive Example | 517 | 491 | 26 | ○ |
| 11 | Inventive Example | 511 | 490 | 21 | ○ |
| 12 | Comparative Example | 155 | 145 | 10 | ○ |
| 13 | Comparative Example | 480 | 188 | 292 | X |
| 14 | Comparative Example | 525 | 320 | 205 | X |
| 15 | Comparative Example | 505 | 438 | 67 | X |
| 16 | Comparative Example | 149 | 138 | 11 | ○ |
| 17 | Comparative Example | 518 | 420 | 98 | X |

Table 5 shows the measurement result of curved shape preservation from aiming. The test samples, wherein the aimed curved shape was as shown in above FIG. 19, were set on a surface plate so that the bow clearance H at the midpoint was measured with a vernier, thus obtaining the difference between maximum bow clearance and minimum one. When the difference of bow clearance thus measured is not greater than 1.5 mm, the curved shape preservation is evaluated as being excellent.

TABLE 5

| Test No. | Classification | Curved Shape Preservation Measurement | | | |
|---|---|---|---|---|---|
| | | Max. Bow Clearance Hmax (mm) | Min. Bow Clearance Hmin (mm) | Difference of Bow Clearance Hmax − Hmin (mm) | Evaluation on Curved Shape Preservation |
| 10 | Inventive Example | 21.0 | 19.7 | 1.3 | ○ |
| 11 | Inventive Example | 20.8 | 19.5 | 1.3 | ○ |
| 12 | Comparative Example | 22.4 | 18.1 | 4.3 | X |
| 13 | Comparative Example | 22.8 | 18.5 | 4.3 | X |
| 14 | Comparative Example | 19.8 | 15.3 | 4.5 | X |
| 15 | Comparative Example | 22.2 | 17.8 | 4.4 | X |
| 16 | Comparative Example | 23.0 | 18.4 | 4.6 | X |
| 17 | Comparative Example | 22.8 | 18.1 | 4.7 | X |

Table 6 shows the measurement result of flattening factor. The outside diameter of test samples was dimensionally inspected at four circumferential locations which were equally divided, wherein the ratio of the maximum reading to the minimum reading was evaluated. When the ratio of the maximum reading to the minimum reading be not less than 99.0%, the flattening property is evaluated as being excellent.

TABLE 6

| Test No. | Classification | Flattening Factor Measurement Ratio of Max.Outside Diameter/Min.Outside Diameter (Dmax/Dmin) | Evaluation on Flattening Factor |
|---|---|---|---|
| 10 | Inventive Example | 99.3-99.6 | ○ |
| 11 | Inventive Example | 99.2-99.7 | ○ |
| 12 | Comparative Example | 93.2-95.3 | X |
| 13 | Comparative Example | 90.0-94.0 | X |
| 14 | Comparative Example | 85.0-90.0 | X |

TABLE 6-continued

| Test No. | Classification | Flattening Factor Measurement Ratio of Max.Outside Diameter/Min.Outside Diameter (Dmax/Dmin) | Evaluation on Flattening Factor |
|---|---|---|---|
| 15 | Comparative Example | 91.0-94.0 | X |
| 16 | Comparative Example | 92.0-95.0 | X |
| 17 | Comparative Example | 91.5-95.5 | X |

Figure 23:
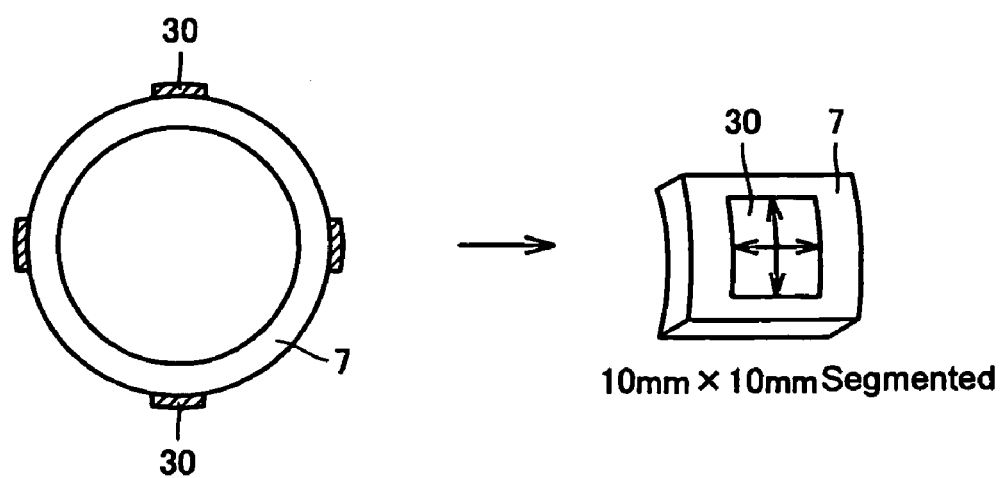
FIG. 23 is a diagram for explaining the measuring method of residual stress that is used in embodiment example 2.

FIG. 23 shows a diagram for explaining the measuring method of residual stress that is used in Example 2. The strain gauge 30 was adhered onto the outer surface of test sample 7 at each of equal four circumferential portions, which were formed by dividing the circumference into. And then the region of 10 mm×10 mm in square, where the strain gauge 30 was set, was segmented for instrumentation of the difference of strain between before and after segmenting, thereby obtaining residual stress. Table 7 shows the maximum residual stress.

TABLE 7

| Test No. | Classification | Residual Stress Measurement Max. Residual Stress (Strain Gauge) (MPa) |
|---|---|---|
| 10 | Inventive Example | −90 |
| 11 | Inventive Example | −78 |
| 12 | Comparative Example | −27 |
| 13 | Comparative Example | +251 |
| 14 | Comparative Example | +790 |
| 15 | Comparative Example | +342 |
| 16 | Comparative Example | +110 |
| 17 | Comparative Example | +419 |

(3) Evaluation on Delayed Fracture

Figure 24:
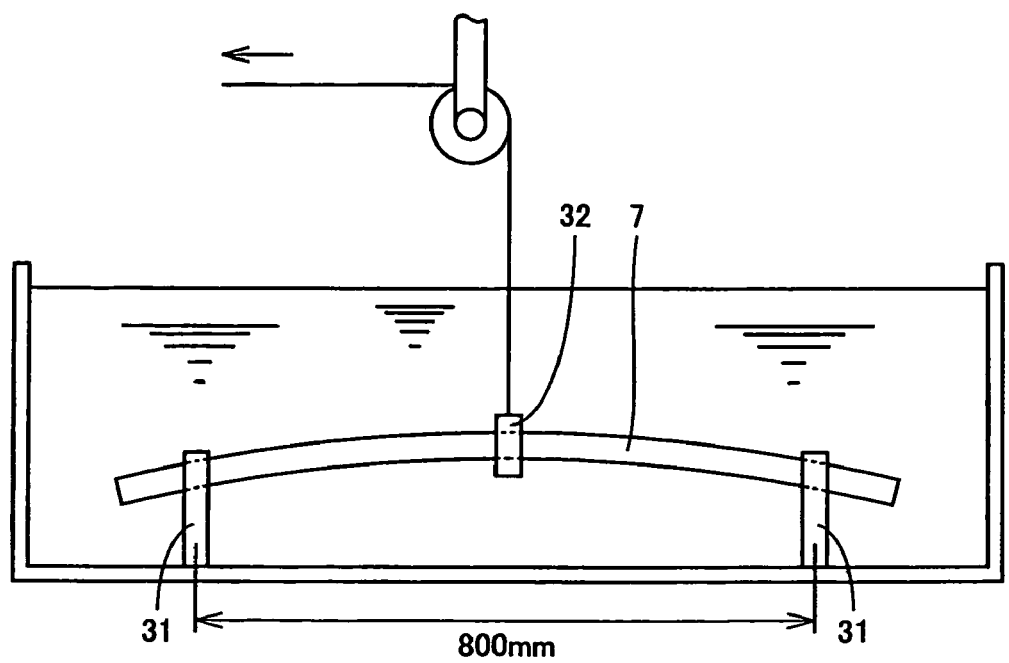
FIG. 24 is a diagram showing the constitution of an apparatus of delayed fracture test that is used in embodiment examples.

FIG. 24 is a diagram showing the constitution of an apparatus of delayed fracture test that is used in Example 2. Test samples were immersed in solution composed of 0.5% acetic acid+artificial seawater, wherein both ends thereof spanning 800 mm were clamped by the fixing jig 31, and wherein a bending stress of 400 MPa was applied for duration of 1000 hrs by using a tension jig 32 disposed in the middle, and, after the test, were subsequently subjected to the visual examination for presence of crack to be generated in test samples.

Table 8 shows the evaluation result of the resistance to delayed fracture, wherein, when no crack be observed by visual examination after the test, it is evaluated as being excellent.

TABLE 8

| Test No. | Classification | Test Condition of Delayed Fracture | | | | Evaluation on Resistance to Delayed Fracture |
|---|---|---|---|---|---|---|
| | | Span for Bending Load | Applied Bending Stress | Solution for Immersion | Duration of Immersion | |
| 10 | Inventive Example | 800 mm | 400 MPa (deadweight: 300 kg) | 0.5% acetic acid + artificial seawater | 1000 hrs | ○ |
| 11 | Inventive Example | | | | | ○ |
| 12 | Comparative Example | | | | | ○ |
| 13 | Comparative Example | | | | | ○ |
| 14 | Comparative Example | | | | | X |
| 15 | Comparative Example | | | | | X |
| 16 | Comparative Example | | | | | ○ |
| 17 | Comparative Example | | | | | X |

(4) Summary of Evaluation

In Test Nos. 10 and 11, Inventive Example, due to rapid cooling after incremental heating and bending process, even if an initial material having a low strength was used as a work tube, the strength level could fully satisfy the tensile strength of 1470 MPa class. Further, in Inventive Examples, the curved shape preservation was excellent, and the homogeneity of hardness as well as flattening property at any cross section over the entire length was satisfactory. Also the residual stress could be lowered, thereby enabling to substantially enhance the resistance to delayed fracture.

On the other hand, in Test No. 12, Comparative Example, although the homogeneity of hardness, the curved shape preservation, and the characteristic of delayed fracture were evaluated as being excellent since incremental heating and bending process was applied, the sufficient strength level could not be obtained due to slow cooling after bending process.

In Test No. 13, Comparative Example, as a work tube having a low strength was subjected to cold bending process, just a slight increase of strength was discerned due to work hardening effect, but the spring back due to cold working was generated, thereby affecting the curved shape preservation as well as flattening property to unsatisfactory level in evaluation.

In Test No. 14, Comparative Example, since a work tube having a high strength was subjected to cold bending process, it was possible to secure a high strength in spite of small work hardening. But the curved shape preservation was unsatisfactory, and the resistance to delayed fracture was unsatisfactory because a large residual stress was generated.

In Test Nos. 15-17, Comparative Examples, since a bending process characterizing in the entire-length heating and curved tube, using a three-point bending test machine shown in FIG. 3B, and thereby the load ramp gradient, the maximum load and the absorbed energy were determined. The respective ratio of the load ramp gradient, the maximum load and the absorbed energy for the curved tube to those for the straight tube are shown in Table 9.

From the results in Table 9, it is found that, even if the thickness is reduced, the curved tube according to the invention allows the load ramp gradient to be enhanced, compared with the straight tube, and therefore an excellent crash capacity can be ensured.

TABLE 9

| | | Dimension of Test Sample | | | | Ratio to Comparative Example | | |
| --- | --- | --- | --- | --- | --- | --- | --- | --- |
| Test No. | Classification | Outside Diameter mm | Thickness mm | Length mm | Degree of Curve % | Load Ramp Gradient (N/mm)/ (N/mm) | Maximum Load (kN)/(kN) | Absorbed Energy (J)/(J) |
| 18 | Inventive Example | 31.8 | 1.6 | 1000 | 0.262 | 3.00 | 1.08 | 1.01 |
| 19 | Comparative Example | 31.8 | 1.8 | 1000 | *0.000 | 1.00 | 1.00 | 1.00 |

Note:
*in the Table denotes the departure from the scope of the present invention bending was applied, the scattering of curved shape preservation was excessive, resulting in poor curved shape preservation. In Test Nos. 15 and 17, Comparative Examples, a high strength was obtained in each case, but the homogeneity of hardness distribution was unsatisfactory, since cooling was carried out over the entire length of work tubes at once, thereby causing unevenness in quench hardening. Also the residual stress became large being incurred by the variation of hardness, thereby affecting the resistance to delayed fracture to be unsatisfactory. In Test No. 16, Comparative Example, since slow cooling was carried out, the insufficient strength was obtained.

Example 3

In order to ascertain the effect of the reduced thickness in a metal tube for reinforcing car body according to the invention, a work tube as initial material having chemical composition represented by 0.22% C-1.20% Mn-0.020% Cr-0.02% Ti-0.0015% B-Balance of Fe and having a low strength (YP: 450 MPa, TS: 555 MPa, EL: 23%) was used, and subjected to, similarly to bending parameters in Example 1, incremental heating and bending process, wherein high frequency induction heating and incremental bending in hot condition were carried out, followed by rapid cooling, thereby enabling test samples having the dimensions of outside diameter, thickness, length and degree of curve as shown in Table 9 along with the strength of 1470 MPa class to be prepared. The test sample thus prepared has 0.262% in degree of curve and has the tensile strength of greater than 1500 MPa class, wherein the microstructure was mainly consisted of martensite and bainite structure.

As a Comparative Example, a straight tube having the dimension of outside diameter, thickness and length as shown in Table 9 along with the tensile strength of greater than 1500 MPa was prepared. A bending test for a span of 1000 mm was carried out as for either the straight tube or the

INDUSTRIAL APPLICABILITY

The metal tube for reinforcing car body according to the invention and the car body reinforcement according to the invention have a curved portion extending over the entire longitudinal length or a local longitudinal length. When the reinforcement is assembled such that the outer periphery of the curved portion is aligned substantially in the direction of impact applied to the car body, the load ramp gradient, the maximum load and the absorbed energy are all enhanced in the case of a car body collision, compared with the conventional reinforcement including a straight tube. In particular, an increase in the load ramp gradient as for the load property at the start of deformation provides an excellent crash capacity in reinforcing the car body. Moreover, the metal tube and the reinforcement according to the invention are capable of satisfying the current requirements increasing more and more for the crash capacity of the car body, along with both a weight reduction of the car body and a reduced manufacturing cost, and therefore they are applicable in a wide field for protecting occupants in an automobile.

What is claimed is:

1. A metal tube for reinforcing a car body, which is mounted onto the car body of an automobile in a two-end support structure to ensure crash capacity, comprising:

a curved portion extending over the entire longitudinal length; and a degree of curve η of not less than 0.002%, the degree of curve η being defined by (S−L)/L×100(%), where S (mm) is the arc length of the curved portion, and L (mm) is the projection length which is determined by projecting the curved portion from an outer periphery to an inner periphery, wherein, when a curved portion is formed for said metal tube, a work tube is successively moved in the axial direction thereof, and the work tube is locally heated at a plastically deformable temperature as well as at a temperature which enables quench hardening, using a high frequency heating coil disposed above the outer periphery of the work tube, and then the work tube is rapidly cooled after a bending moment is applied to the heated portion to form the curved portion incrementally.

2. A metal tube for reinforcing a car body, which is mounted onto the car body of an automobile in a two-end support structure to ensure crash capacity, comprising:
a curved portion extending over a local longitudinal length; and
a degree of curve η of not less than 0.002%, the degree of curve η being defined by (S−L)/L×100(%), where S (mm) is the arc length of the curved portion, and L (mm) is the projection length which is determined by projecting the curved portion from an outer periphery to an inner periphery,
wherein, when a curved portion is formed for said metal tube, a work tube is successively moved in the axial direction thereof, and the work tube is locally heated at a plastically deformable temperature as well as at a temperature which enables quench hardening, using a high frequency heating coil disposed above the outer periphery of the work tube, and then the work tube is rapidly cooled after a bending moment is applied to the heated portion to form the curved portion incrementally.

3. The metal tube for reinforcing a car body according to claim 1, wherein the ratio of a load ramp gradient of said metal tube to that of a straight tube is not less than 1.25, when a three-point bending test in constrained support at both ends is applied.

4. The metal tube for reinforcing a car body according to claim 2, wherein the ratio of a load ramp gradient of said metal tube to that of a straight tube is not less than 1.25, when a three-point bending test in constrained support at both ends is applied.

5. The metal tube for reinforcing a car body according to claim 1, wherein the sectional profile of said metal tube exhibits a circular shape or an elliptic shape or a circular-like shape or an elliptical-like shape.

6. The metal tube for reinforcing a car body according to claim 2, wherein the sectional profile of said metal tube exhibits a circular shape or an elliptic shape or a circular-like shape or an elliptical-like shape.

7. A car body reinforcement, wherein ends of the metal tube of claim 1 are jointed to a car body for reinforcing the car body, an outer periphery of the curved portion in said metal tube is aligned substantially in a direction of impact applied to the car body.

8. A car body reinforcement, wherein ends of the metal tube of claim 2 are jointed to a car body for reinforcing the car body, a outer periphery of the curved portion in said metal tube is aligned substantially in a direction of impact applied to the car body.

9. The car body reinforcement according to claim 7, wherein said reinforcement is applicable to a door impact bar, a front bumper beam, a rear bumper beam, a cross member reinforcement, a front pillar reinforcement, a center pillar reinforcement and a side sill.

10. The car body reinforcement according to claim 8, wherein said reinforcement is applicable to a door impact bar, a front bumper beam, a rear bumper beam, a cross member reinforcement, a front pillar reinforcement, a center pillar reinforcement and a side sill.

11. The car body reinforcement according to claim 7, wherein the compression resistance strength Fb (kN) of said metal tube for reinforcing the car body at an end thereof satisfies the following inequality (1):

$$Fb > 5\eta^{0.4} \qquad (1)$$

where η=(S−L)/L×100 (%)
S: Arc length (mm) of the curved portion along the tube
L: Projection length (mm) determined by projecting the curved portion from the outer periphery to the inner periphery.

12. The car body reinforcement according to claim 8, wherein the compression resistance strength Fb (kN) of said metal tube for reinforcing the car body at an end thereof satisfies the following inequality (1):

$$Fb > 5\eta^{0.4} \qquad (1)$$

where η=(S−L)/L×100 (%)
S: Arc length (mm) of the curved portion along the tube
L: Projection length (mm) determined by projecting the curved portion from the outer periphery to the inner periphery.

13. The car body reinforcement according to claim 7, wherein said metal tube for reinforcing the car body has brackets for jointing it to the car body at both ends.

14. The car body reinforcement according to claim 8, wherein said metal tube for reinforcing the car body has brackets for jointing it to the car body at both ends.

15. The car body reinforcement according to claim 13, wherein, when the said metal tube is used as a door impact bar, each said bracket is a flat bracket or a step bracket or a hinge-unified bracket.

16. The car body reinforcement according to claim 14, wherein, when the said metal tube is used as a door impact bar, each said bracket is a flat bracket or a step bracket or a hinge-unified bracket.

17. The car body reinforcement according to claim 13, wherein the compression resistance strength Fb (kN) of each said bracket satisfies the following inequality (1):

$$Fb > 5\eta^{0.4} \qquad (1)$$

where η=(S−L)/L×100 (%)
S: Arc length (mm) of the curved portion along the tube
L: Projection length (mm) determined by projecting the curved portion from the outer periphery to the inner periphery.

18. The car body reinforcement according to claim 14, wherein the compression resistance strength Fb (kN) of each said bracket satisfies the following inequality (1):

$$Fb > 5\eta^{0.4} \qquad (1)$$

where η=(S−L)/L×100 (%)
S: Arc length (mm) of the curved portion along the tube
L: Projection length (mm) determined by projecting the curved portion from the outer periphery to the inner periphery.

19. The car body reinforcement according to claim 15, wherein the compression resistance strength Fb (kN) of each said bracket satisfies the following inequality (1):

$$Fb > 5\eta^{0.4} \qquad (1)$$

where η=(S−L)/L×100 (%)
S: Arc length (mm) of the curved portion along the tube
L: Projection length (mm) determined by projecting the curved portion from the outer periphery to the inner periphery.

20. The car body reinforcement according to claim 16, wherein the compression resistance strength Fb (kN) of each said bracket satisfies the following inequality (1):

$$Fb > 5\eta^{0.4} \quad (1)$$

where $\eta = (S-L)/L \times 100$ (%)
- S: Arc length (mm) of the curved portion along the tube
- L: Projection length (mm) determined by projecting the curved portion from the outer periphery to the inner periphery.

21. The metal tube for reinforcing a car body according to claim 1, wherein the curved portion has a curved structure based on an incremental bending of the metal tube after the heating step.

22. The metal tube for reinforcing a car body according to claim 2, wherein the curved portion has a curved structure based on an incremental bending of the metal tube after the heating step.

* * * * *